US012577932B2

(12) United States Patent
Peterson et al.

(10) Patent No.: US 12,577,932 B2
(45) Date of Patent: Mar. 17, 2026

(54) HYDRODYNAMIC POWER GENERATOR AND SYSTEM

(71) Applicant: Next Marine Solutions, Inc., South Bristol, ME (US)

(72) Inventors: William Peterson, South Bristol, ME (US); Amanda Similien, Brunswick, ME (US); Thomas Logan Livingston, Damariscotta, ME (US)

(73) Assignee: Next Marine Solutions, Inc., South Bristol, ME (US)

( * ) Notice: Subject to any disclaimer, the term of this patent is extended or adjusted under 35 U.S.C. 154(b) by 0 days.

(21) Appl. No.: 18/668,682

(22) Filed: May 20, 2024

(65) Prior Publication Data

US 2024/0301857 A1 Sep. 12, 2024

Related U.S. Application Data

(62) Division of application No. 17/824,316, filed on May 25, 2022, now Pat. No. 12,006,907.

(Continued)

(51) Int. Cl.

*F03B 17/00* (2006.01)
*F03B 13/10* (2006.01)
*F03B 17/06* (2006.01)

(52) U.S. Cl.

CPC ............ *F03B 17/061* (2013.01); *F03B 13/10* (2013.01); *F05B 2240/14* (2013.01); *F05B 2240/97* (2013.01)

(58) Field of Classification Search

CPC ...... F03B 17/061; F03B 13/10; F03B 13/264; F03B 11/08; F05B 2240/14;

(Continued)

(56) References Cited

U.S. PATENT DOCUMENTS 4,219,303 A 8/1980 Mouton, Jr. et al.
7,713,020 B2 5/2010 Davidson et al.
8,022,567 B2 * 9/2011 Davis ...................... F03B 3/128 290/54

(Continued)

FOREIGN PATENT DOCUMENTS

CN 106438166 A 2/2017
GB 2394514 A 4/2004

(Continued)

OTHER PUBLICATIONS

Communication pursuant to Article 94(3) EPC received for EP Application No. 22 735 693.8-1002, dated Jul. 30, 2024. 3 pages.

(Continued)

*Primary Examiner* — Julio C. Gonzalez
(74) *Attorney, Agent, or Firm* — Finch Maloney PLLC

(57) ABSTRACT

This disclosure is directed to hydrodynamic electric generators, including their structural design, methods of deployment, anchoring systems, drive systems and control systems. The system can be scaled from ones that can be hand carried to large, stationary devices that can generate up to and greater than 20 kw in a current of 3 knots. In a stationary system, the device can be anchored to an underwater floor by an anchoring device supported by four adjustable legs. These legs can eliminate the need for extensive mooring lines, providing the device with a small footprint that is non-hazardous to marine animals or vegetation. Individual components, such as rotors, generators and other mechanical components can be modularly installed for easy removal and servicing without having to disturb the entire system.

19 Claims, 18 Drawing Sheets

Related U.S. Application Data

(60) Provisional application No. 63/192,880, filed on May 25, 2021.

(58) Field of Classification Search
CPC ............ F05B 2240/97; F05B 2240/372; F05B 2240/9151; F05B 2240/133; F05B 2260/04; F05B 2260/221; F05B 2270/18
See application file for complete search history.

(56) References Cited

U.S. PATENT DOCUMENTS

| | | | |
|---|---|---|---|
| 8,405,236 | B2 | 3/2013 | David |
| 10,294,913 | B2 | 5/2019 | Schurtenberger |
| 2003/0193198 | A1 | 10/2003 | Wobben |
| 2010/0327583 | A1 | 12/2010 | Hunt |
| 2013/0341930 | A1 | 12/2013 | Campagna |
| 2014/0028028 | A1 | 1/2014 | Frye |
| 2018/0347539 | A1 | 12/2018 | Van Der Schee |
| 2022/0381217 | A1 | 12/2022 | Peterson et al. |

FOREIGN PATENT DOCUMENTS

| | | | |
|---|---|---|---|
| GB | 2463313 | A | 3/2010 |
| WO | 2022251320 | A1 | 12/2022 |

OTHER PUBLICATIONS

Chen, F., "Appendix A: Catalog of Global Underwater Turbines," The Kuroshio Power Plant, Lecture Notes in Energy 15, Springer International Publishing (2013). pp. 177-225.

"River Turbines," TECHNOLOGY, retrieved from the internet at: https://www.cleancurrent.com/technology/ (Mar. 23, 2021). 3 pages.

"SRTT Floating Tidal Turbine Production Design Study With Independent Verification," Contract No. T/06/00245/00/REP, URN:07/1463. Contractors Scotrenewables LTD and Heriot-Watt University (ICIT). (Oct. 2007). 83 pages.

Saleem, et al., "On site Electrochemical Production of Sodium Hypochlorite Disinfectant for a Power Plant utilizing Seawater," International Journal of Electrochemical Science, 7 (May 1, 2012). pp. 3929-3938.

International Preliminary Report on Patentabilty received for PCT/US2022/030869. Mail date: Dec. 7, 2023. 10 pages.

International Search Report and Written Opinion received for PCT/US2022/030869. Mail date: Nov. 16, 2022. 13 pages.

Belloni, Clarissa, "Hydrodynamics of Ducted and Open-Centre Tidal Turbines," University of Oxford, Thesis, 2013. 240 pages.

Kirke, Brian, "Developments in ducted water current turbines," originally published at www.cyberiad.net, 2003. 13 pages.

* cited by examiner

HYDRODYNAMIC POWER GENERATOR AND SYSTEM

CROSS REFERENCE TO RELATED APPLICATIONS

This application is a divisional of U.S. application Ser. No. 17/824,316, filed May 25, 2022, which claims the benefit of U.S. provisional application No. 63/192,880, filed May 25, 2021, the disclosures of which are incorporated by reference herein in their entirety.

TECHNICAL FIELD

The present disclosure relates generally to systems for the generation of electrical power from hydrodynamic forces and, in particular, to the generation of electricity from tidal and river flows.

BACKGROUND

Systems designed to extract energy from natural flows in oceans and rivers have been available for years but issues such as efficiency, cost, deployment, reliability and environmental impact have prevented them from becoming reliable sources of power generation. There has been a long felt need to address these issues, and improvements in the field are necessary in order to increase the use of these energy sources as part of the world's energy portfolio.

SUMMARY

Designs of different hydroelectric generators and their method of deployment and use are described herein.

According to an embodiment, a housing for a hydrokinetic system includes a duct having an interior surface defining a central passageway and an exterior surface, an annular compartment defined by the interior and exterior surfaces, the annular compartment housing at least one mechanical component coupled to an electrical generator, and at least one ballast tank positioned in the annular compartment. The duct is substantially circular in cross-section and the central passageway has a first diameter and the duct further includes a first opening with a second diameter and a second opening with a third diameter, the second and third diameters both being greater than the first diameter.

According to another embodiment, a hydrokinetic system includes a duct, a plurality of rotors retained in the duct, a strut securing one of the plurality of rotors to the duct, a differential in mechanical communication with at least some of the plurality of rotors, and a generator. Each rotor includes a plurality of blades and a hub connecting the blades of the rotor to a rotor shaft. The strut defines a channel for housing a belt or drive shaft, the belt or drive shaft in mechanical communication with the rotor shaft. The differential is constructed and arranged to receive different rotational velocity inputs from the at least some of the plurality of rotors and to drive an output shaft with a single rotational velocity. The generator is coupled to the output shaft and configured to generate electrical power based on a rotation of the output shaft.

According to another embodiment, an anchoring structure for a hydrokinetic generator includes a platform having an upper surface and a lower surface, a semi-circular cradle coupled to the upper surface of the platform, and a plurality of telescoping legs coupled to edge portions of the platform. The semi-circular cradle is configured to support a cylindrical duct having one or more rotors disposed within the duct. At least one of the telescoping legs includes a cable that is configured to pass through the corresponding telescoping leg and connect to an anchor fixed to a floor in a body of water.

According to another embodiment, a hydrokinetic electrical system includes one or more rotors retained in a duct that is configured to be deployed into a body of water, a generator, a transfer cable coupled to the generator, and a battery charger. Each rotor comprises a plurality of blades and a hub connecting the blades of the rotor to a rotor shaft. The generator is configured to output electrical power based on rotation of the rotor shaft of each of the one or more rotors. The transfer cable is configured to carry the outputted electrical power away from the duct and to an onshore control station. The battery charger is configured to charge one or more batteries based on the outputted electrical power.

According to another embodiment, a method of deploying a hydrokinetic device includes securing one or more cables to the floor of a body of water, securing the hydrokinetic device to an anchoring structure having a plurality of telescoping legs, threading at least one of the one or more cables through at least one of the telescoping legs on the anchoring structure, reducing the buoyancy of the hydrokinetic device, thus causing both the hydrokinetic device and the anchoring structure to sink through the body of water, guiding the anchoring structure to the floor via the one or more cables fed through the at least one of the telescoping legs, and securing the anchoring structure to the floor.

DETAILED DESCRIPTION

Figure 1:
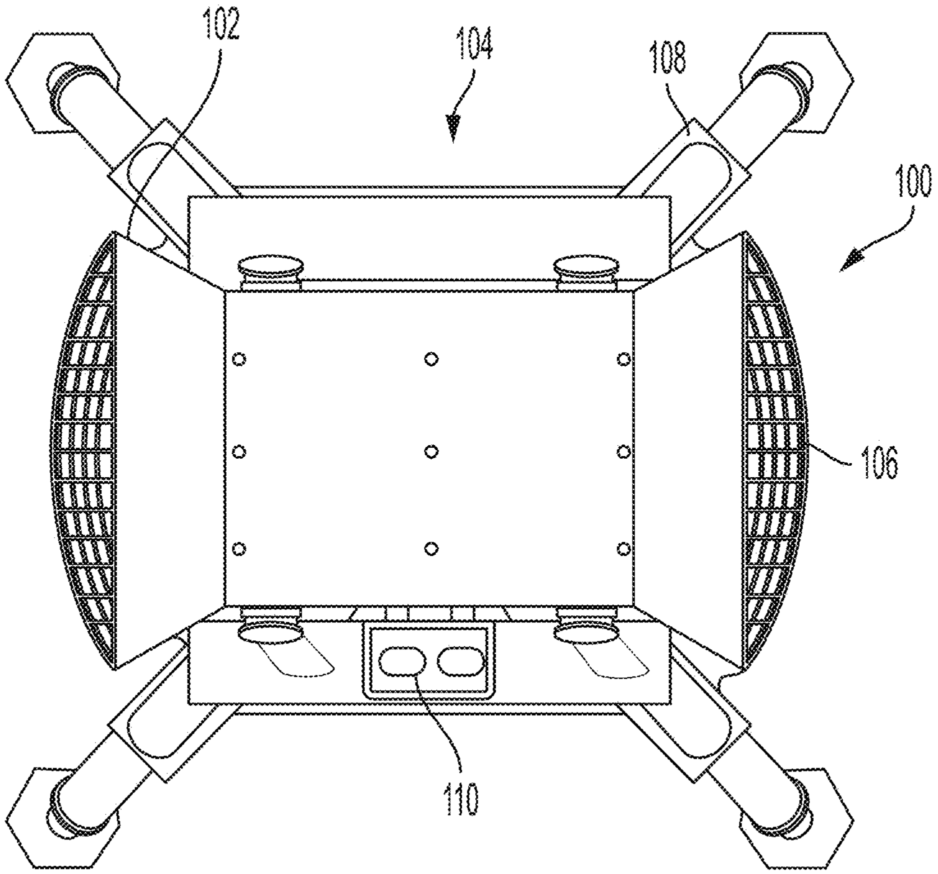
FIG. 1 illustrates an example hydrokinetic system having a duct that rests upon an anchoring structure, according to some embodiments of the present disclosure.

This disclosure is directed to hydrodynamic electric generators, including their structural design, methods of deployment, anchoring systems, drive systems and control systems. The system can be scaled from ones that can be hand carried to large, stationary devices that can generate up to and greater than 20 kw in a current of 3 knots. In a stationary system, the device can be anchored to the seabed or riverbed by a cradle supported by four adjustable legs. These legs can eliminate the need for extensive mooring lines, providing the device with a small footprint that is non-hazardous to endangered species such as right whales. Individual components, such as rotors, generators and transmissions can be modularly installed for easy removal and servicing without having to disturb the entire system. In a portable system, the device can be small enough to be carried on the back of a person, or by lifting between two people, and placed within a river or other location with moving water. The portable system may have the same overall rotor and generator design as the larger stationary system but scaled down.

The system can employ multiple rotors that extract maximum energy at relatively low speed and provide redundancy should one of the rotors fail or need servicing. The rotors are exposed to high flux by revolving around a small central hub that transmits mechanical energy via shafts or belts that are located in the struts that connect the rotors to the housing. There is no motor or generator housing in the flow stream, so more of the flow can be utilized. The system can be bi-directional, taking advantage of alternating tides without changing position. The rotor blades can be self-feathering in response to direction of flow. The multiple rotors can be linked mechanically via single or multiple transmissions. Alternatively, the rotors can drive independent generators and the electrical output of each can be combined.

The housing has an internal surface that is conically shaped to narrow at the waist and expand towards each opening. This reduction in cross sectional area helps to accelerate flow past the rotors. An expanding region at the exit also contributes to accelerated flow. The outer surface can match the contours of the interior surface or can be different, for example, cylindrical or ovoid. Compartments are formed in a space between the inner and outer walls. These compartments can house electrical and mechanical components as well as buoyancy chambers that can be filled and drained to alter the overall buoyancy and attitude of the device. The ballasting system allows the device to be towed on the water's surface and provides operators with an easy way to lower the device to its intended depth. Furthermore, the ballasting system can be used with the portable device to maintain a fixed depth below the surface of the water or a fixed depth above the sea or riverbed. The external surface of the device can include fins, that may be retractable, for stabilizing the device in the flow it is being exposed to. The buoyancy chambers and/or fins can also be used to adjust the yaw of the device to help maximize the flow of water through the device.

The housing of the device can include a coating or outer skin that provides, for example, protection against damage, corrosion protection, electrical insulation, sound dampening and resistance to biological growth. The outer skin can be of consistent or varied colors and patterns, and it can be selected for purposes of camouflage or to repel marine animals. Alternatively, or in addition, the device can expel chlorine gas from multiple outlets along the outer edges of the duct opens. The chlorine gas runs along the inner surfaces of the duct to help clean the surfaces from any biofouling and recombines with the water. The chlorine gas may be extracted from the saltwater via an electrical separation process described in more detail herein.

Methods of deployment and extraction can vary with the size and end use of the system. As noted above, smaller versions of the device can be deployed in a river by one or two people simply by placing the device in the current and securing one, two or more anchor points. Mid-sized versions can be deployed in rivers using cables to suspend the device in the flow without attaching directly to the river bottom. Larger versions may be deployed on a seabed or riverbed. For systems involving stationary anchored devices, one, two, three, four or more cables can be anchored to the seabed floor using, for instance, a T-anchor or screw anchor. The secured cables are threaded through the legs of the support system and the device is chased down to the seabed by sliding the cables through the legs. In this manner, each leg can be positioned directly over, or close to, the anchor point. The cables can be removed or retained in the support system, avoiding any chance of interfering with marine wildlife. In some cases, the device can be maneuvered into position by powering one or more rotors and using them as low speed propellers to provide thrust.

Control systems include systems for monitoring, diagnostics and operating. The devices can be essentially autonomous or can take instructions from a remote operator and can be wired or wireless. For instance, ballast tanks can be controlled automatically or remotely to provide an optimum angle of the device for maximum flow through. Rotors, transmissions and generators can provide real time data regarding output, efficiency and health. Remote cameras, microphones, levels, pressure sensors, flow meters and thermometers can provide additional information regarding nearby animal life, vibration noises, mechanical operation and level of buildup of debris on the filtering screen.

The systems described herein can be deployed for temporary use (e.g., part of a day) or for long-term use (e.g., many years). Maintenance is minimized as a result of housed components, bio-resistant coating and a modular design. Once a system is deployed, it should not need to be retrieved until the end of its useful life, e.g., 20 years. The use of a filtering screen prevents large animals, plants and debris from entering the system and slow moving rotors allow for the safe passage of smaller marine animals. The device can be operated unobtrusively and below shipping depth, allowing for deployment in any location that provides a harvestable flow. For example, the device can be moored 20 ft, 30 ft, 40 ft or 50 ft below the water's surface.

The systems described herein are capable of providing on-demand and local power generation for a variety of applications. Locally installed batteries either within the annular compartments of the device itself, or in another nearby location connected via cables can be used to store electrical energy that is not currently being used. Power can then be drawn from the batteries at any time or directly from the generators within the device. A control system may be used to determine whether power is to be drawn from the batteries, from the generators, or from both. Example applications for the systems described herein include marine charging stations at docks or any other location where moving water is present.

FIG. 1 illustrates an example hydrokinetic system 100 that includes a large duct 102 resting upon an anchoring structure 104 in an underwater environment, according to some embodiments. Hydrokinetic system 100 may be deployed for a long period of time (e.g., years) within the water to generate electrical energy from the underwater currents that turn one or more rotors within duct 102. Due to the duration of use for hydrokinetic system 100 and the presence of anchoring structure 104, duct 102 can be made very large (e.g., about 50 feet long and with a diameter of about 30 feet at the widest flared ends) to generate a large amount of electrical energy based on a large volume of fluid flow past the rotors.

According to some embodiments, duct 102 includes a grating 106 over each of its openings to prevent large debris from entering into duct 102. Grating 106 can have a convex shape, as illustrated, to passively cause debris to slide away from the openings of duct 102 after contacting grating 106. In some embodiments, grating 106 includes a repeating pattern of no smaller than one square inch, such as a repeating square pattern, repeating diamond pattern, or a repeating triangular pattern. Grating 106 can be made from stainless steel, although any other sufficiently rigid material with good anti-biofouling properties may be used as well.

Although the rotors within duct 102 are rotating based on the speed of the water flow, the grating 106 may be used to prevent large objects such as stumps, marine mammals, large fish, debris and divers from moving through duct 102. This helps prevent potential damage to the inside of duct 102 as well as prevent potential damage of the rotors. In some embodiments, grating 106 is removable if or when it needs to be cleaned. In some examples, the bi-directional flow of water through duct 102 will help keep grating 106 on a periodic maintenance cycle. In other cases, the device can be flipped longitudinally 180 degrees so that the flow of water passes through the device in the opposite direction.

According to some embodiments, anchoring structure 104 includes a plurality of legs 108 that contact a bed or floor of the underwater environment to stabilize anchoring structure 104. Each of legs 108 may be a telescoping leg that has an adjustable length to compensate for an uneven underwater surface. Anchoring structure 104 may also include a region to hold an electric generator 110, such as an AC generator, that is coupled to the mechanical rotors within duct 102 via one or more linkages as will be discussed in more detail herein. The power generated from electric generator 110 can be brought to an onshore control station via one or more cables that run from electric generator 110 to the onshore control station along, for example, the underwater bed.

According to some embodiments, anchoring structure 104 is lowered through the water and anchored to the underwater bed in a predetermined location. Afterwards, duct 102 is lowered through the water and guided over anchoring structure 104 until it settles on top of anchoring structure 104. In some embodiments, the weight of duct 102 alone is enough to keep it settled on top of anchoring structure 104. In some other embodiments, duct 102 is mechanically fastened to anchoring structure 104 after being aligned over and on anchoring structure 104. Further details regarding the design and operation of each of the components of hydrokinetic system 100 are discussed herein.

Figure 2A:
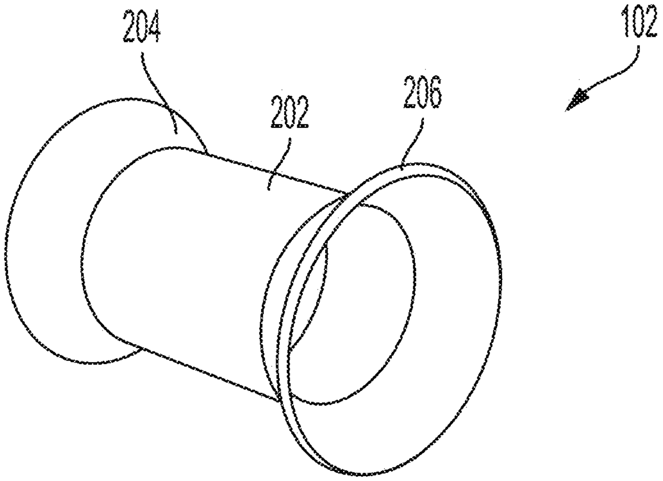
FIGS. 2A-2C illustrate views of a duct of the hydrokinetic system from FIG. 1, according to some embodiments of the present disclosure.

FIG. 2A illustrates a three-dimensional representation of duct 102, according to some embodiments. Duct 102 includes a central passageway 202 connecting a first flared end 204 with a second flared end 206. Each of first flared end 204 and second flared end 206 terminate with an opening having a diameter larger than that of a diameter of central passageway 202. In some embodiments, first flared end 204 is identical to second flared end 206. Accordingly, the openings at the terminal end of each of first flared end 204 and second flared end 206 may have the same diameter. Central passageway 202 may include substantially straight walls between each of first flared end 204 and second flared end 206. In some other embodiments, central passageway 202 includes curved or sloped walls such that a continuous curved outer surface is formed between each of first flared end 204 and second flared end 206. The curve can be inwards or outwards.

Figure 2B:
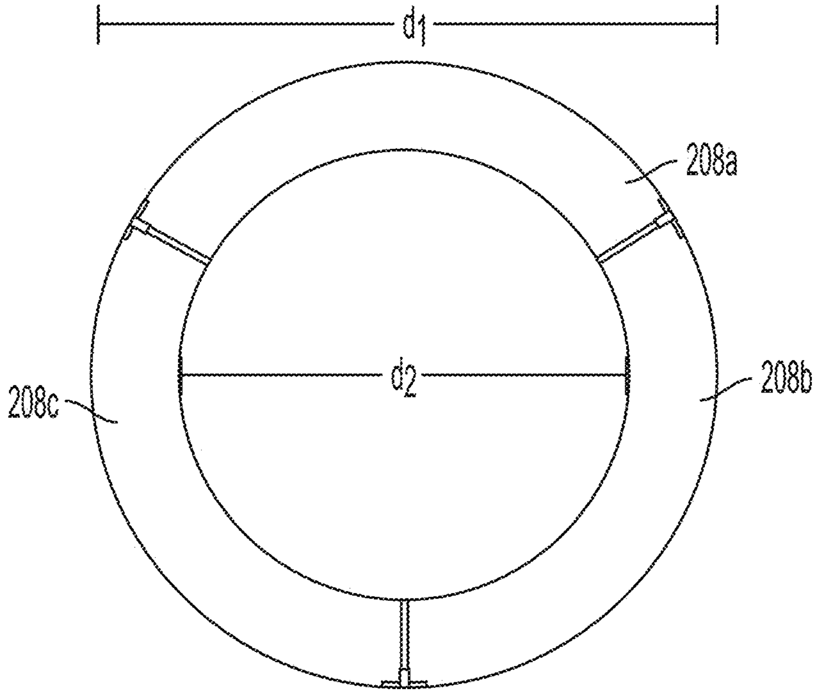

FIG. 2B illustrates a front-facing view of duct 102, according to some embodiments. Duct 102 may be formed via a plurality of panels 208*a*-2080*c* that are coupled together at seams filled with, for example, a pourable epoxy. Each of panels 208*a*-208*c* may be substantially identical to one another. Although three panels are illustrated, any number of panels may be used to form duct 102. Duct 102 may have an outer diameter $d_1$ between about 12" and about 24", between about 20" and about 40", between about 30" and about 50", between about 20" and about 80", or between about 80" and about 90", such as around 84" and an inner diameter $d_2$ (e.g., at a midpoint of central passageway 202) between about 55" and about 65", such as around 59". Outer diameter $d_1$ can be consistent along its length or can vary. For example, outer diameter may be the same along its length, may be greater in the middle portion, or may be greater at either or both end portions.

Figure 2C:
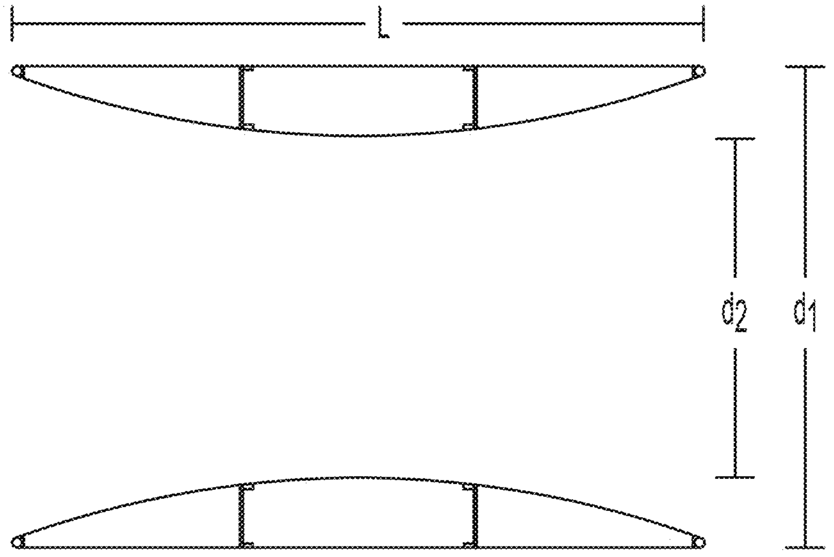

FIG. 2C illustrates a cross-section view of duct 102 having a parabolically curved inner surface and a straight outer surface between the openings at opposite ends of duct 102. Accordingly, the diameter of duct 102 continually increases from the midpoint of the duct (having diameter $d_2$) outwards to each end of the duct (having diameter $d_1$). In some examples, duct 102 has a total length L between about 30" and about 60", between about 40" and about 80", or between about 105" and about 135", such as around 120".

Duct 102 may be formed using interlocking panels, such as any number of curved segments that mechanically link together, or it may be one monolithically machined piece. Duct 102 and all of its associated surfaces may be formed from a composite material, mild steel, or stainless steel. The interior diameter of central passageway 202 is defined by an inner surface of duct 102 while an outer surface of duct 102 provides its overall shape. In some embodiments, the outer surface of central passageway 202 remains straight extending between first flared end 204 and second flared end 206 while the inner surface of central passageway 202 curves inwards between first flared end 204 and second flared end 206 such that the interior diameter of central passageway 202 has a minimum distance at the midpoint between first flared end 204 and second flared end 206.

According to some embodiments, an annular compartment exists between the inner and outer surfaces of duct 102. In some embodiments, the annular compartment extends at least around central passageway 202. In some embodiments, the annular compartment includes some of the mechanical components used to transfer the mechanical energy to the electrical generators. In some embodiments, the annular compartment includes one or more ballast tanks that can be filled with air or water to affect the overall buoyancy of duct 102. Further details regarding the mechanical linkages within duct 102 and its annular compartment are provided with reference to FIG. 4.

The flared ends of duct 102 may be used to enhance the water flow through central passageway 202. Horizontal axis turbines disposed within central passageway 202 are generally preferred over vertical access turbines because they are easier to self-start, have a higher efficiency and larger speed operation. In addition, horizontal axis turbines have less torque fluctuation. According to some embodiments, one role of the convergent flare (e.g., the flared end acting as the inlet) is to increase the extracted electrical power potential by increasing the mass flow or speed of the water through central passageway 202. This flow directly affects the rotor(s) speed. According to some embodiments, one role of the divergent flare (e.g., the flared end acting as the outlet) is to diffuse the water as it leaves central passageway 202 which can, in turn, create a sucking effect drawing the water out of central passageway 202 at a higher rate than a straight edged cylinder.

Figure 3:
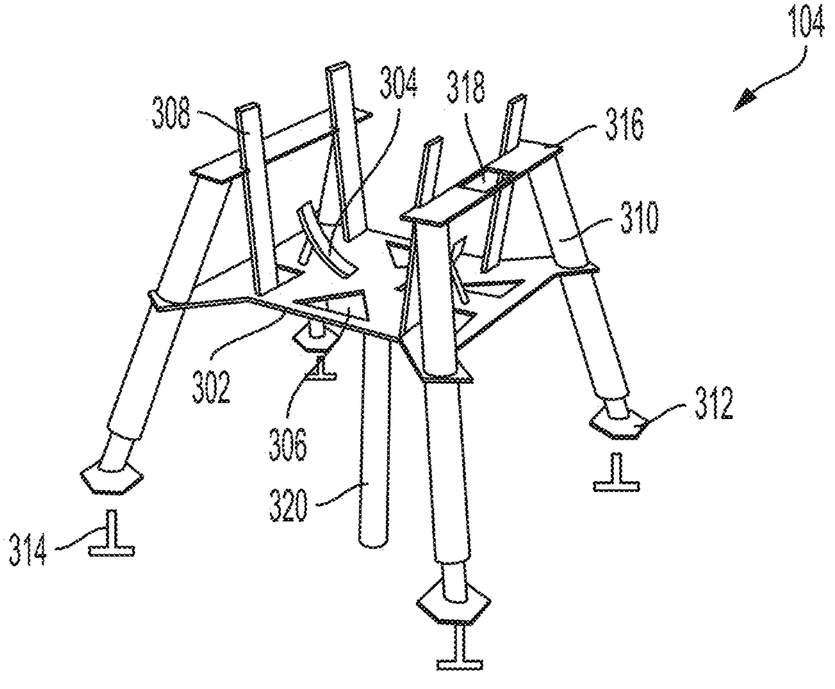
FIG. 3 illustrates an anchoring structure used to support the hydrokinetic system from FIG. 1, according to some embodiments of the present disclosure.

FIG. 3 illustrates an isometric three-dimensional representation of anchoring structure 104 with duct 102 removed, according to an embodiment. Anchoring structure 104 includes various components arranged to support and secure duct 102. According to some embodiments, the core of anchoring structure 104 includes a platform 302 having an upper and lower surface and a cradle 304 coupled to the upper surface of platform 302. Cradle 304 may have a semicircular shape that is sized to fit snuggly around central passageway 202 of duct 102. Although only one cradle 304 is illustrated, there may be several cradle structures arranged in a row to support duct 102. In some embodiments, cradle 304 has a different shape to fit the contour of the outer shape of any duct resting upon it. Cradle 304 and/or platform 302 may be constructed from any fiberglass reinforced plastic (FRP) and/or stainless steel.

In some embodiments, platform 302 includes one or more openings 306 that extend between the upper and lower surfaces of platform 302. Openings 306 may be cut into particular shapes or designs. The presence of openings 306 lightens the overall weight of anchoring structure 104 and allows the structure to be lowered more easily through the water when it is being deployed to the bottom of the underwater environment, according to some embodiments.

A plurality of guideposts 308 may also be connected to the top surface of platform 302. Guideposts 308 may be used to additionally support duct 102 in a given position over platform 302. In some embodiments, guideposts 308 extend above a height of duct 102 and are angled outwards to provide a wedge shape that duct 102 can fit between.

According to some embodiments, anchoring structure 104 includes a plurality of legs 310 coupled to platform 302. Each of legs 310 may be coupled to a corner of platform 302 or along a different side of platform 302. Four legs 310 are illustrated in FIG. 3, however, any number of legs 310 can be used. According to some embodiments, legs 310 are telescoping legs with adjustable height in order to sit upon an uneven underwater floor. Legs 310 may be splayed slightly outwards to create a trapezoidal stance for the anchoring structure 104. This shape enables anchoring structure 104 to effectively resist lateral forces coming from any direction, thus allowing the supported duct 102 to maintain its precise position regardless of tidal shift, debris impact, high seas, etc.

Each of legs 310 has a first end that extends above platform 302 and a second end that extends below platform 302. According to some embodiments, compression rods (not shown) may be used to connect between adjacent legs 310 to provide additional structural support. At the distal portion of the second end of each leg 310 is a footpad 312, according to some embodiments. Footpad 312 may be flexible to provide better traction on the underwater floor.

According to some embodiments, footpad 312 is designed to fit over an anchor 314 that is secured to the underwater floor. A separate anchor 314 may be secured within the underwater floor for each corresponding leg 310. According to some embodiments, a cable is tied to a given anchor and fed through a hollow portion within a corresponding one of legs 310. Once cables, each coupled to a respective anchor, have been fed through each of legs 310, the entire anchoring structure 104 can be lowered through the water and guided by the cables running through each of legs 310 until they align over each corresponding anchor 314.

In order to position anchoring structure 104 in the precise location and orientation for optimal power generation, a hydrographic survey of the installation site may first be conducted. Each anchor location can be determined and installed prior to the deployment of anchoring structure 104. In one example, the survey provides a sonar picture of the site hydrography (x,y,z soundings) to enable pre-adjustments of the lengths for each of legs 310. The survey can also provide sufficient detail of the bottom texture and composition to be able to plan for the type of anchor 314 required for each leg 310. After the survey is complete, each leg's specific anchor 314 can be affixed to the underwater floor and cabling is then run to the surface. Each of the pre-drilled, embedded or pinned anchors' cables can then be threaded through their respective leg 310 of anchoring structure 104. As anchoring structure 104 is lowered through the water, these cables will guide each leg 310 to its own precise, predetermined location over a corresponding anchor 314. According to some embodiments, each leg 310 with its respective footpad 312 will cover its corresponding anchor 314 as anchoring structure 104 is lowered to the bottom. In some embodiments, a series of pulley and cams are disposed within each leg 310 to allow the cables to be tautened, firmly anchoring the anchoring structure 104 to the underwater floor. Further details regarding the deployment of anchoring structure 104 and duct 102 are provided herein.

According to some embodiments, anchor 314 is a jetted embedment anchor. Jetted embedment anchors are an effective anchor type in a sand, mud, silt, or small pebble bottom. The anchor is jetted into the underwater floor through a cylindrical shaped structure that is pre-positioned, typically using a firehose from a vessel overhead on the sea surface. This firehose provides enough pressure inside the cylinder to temporarily loosen the seabed compaction at the nozzle site and push the anchor mechanism deep into the underwater floor. As the cylinder is removed, the displaced sediment fills the cavity it leaves behind and firmly secures the embedded anchor. The holding capacity of a jetted embedded anchor can be amplified by increasing any of the following: anchor cone diameter (area), emplacement depth, compaction of overburden sediment or use of a cement slurry.

According to some embodiments, anchor 314 is a plate anchor. In one example, a circular plate anchor includes a large circular plate which is embedded in the underwater floor in a vertical orientation then when it is shifted to the horizontal orientation provides holding capacity. Once in this horizontal position, the plate anchor resists upward removal from the underwater floor.

According to some embodiments, anchoring structure 104 includes a secondary platform 316 coupled between the first ends (extending above platform 302) of adjacent ones of legs 310. Secondary platform 316 may be arranged parallel with platform 302. An additional secondary platform may be provided on an opposite side of anchoring structure 104. Secondary platform 316 may include a region 318 configured to support a pod containing an electrical generator. In this way, the pod can be placed within region 318 and removed from region 318 with ease to perform possible maintenance on the generator or to switch out with another generator.

According to some embodiments, a hollow piling 320 is coupled to a lower surface of platform 302. Hollow piling 320 extends towards the underwater floor and can provide a conduit for threading power cables and/or any other electrical cables. Any of the cables may carry electrical current generated from the electrical generator or provide power to any sensors disposed around duct 102 or on the electrical generator. According to some embodiments, the cables can be fed through hollow piling 320 and along the underwater floor (or beneath the underwater floor) to be brought to an above-ground control station. In some embodiments, hollow piling 320 is driven, augured, or pinned to the underwater floor and can serve as a centering guide and/or primary anchor for anchoring structure 104. In some embodiments, one or more compression rods (not shown) may be used to connect between hollow piling 320 and any of legs 310 to provide additional structural support.

Figure 4A:
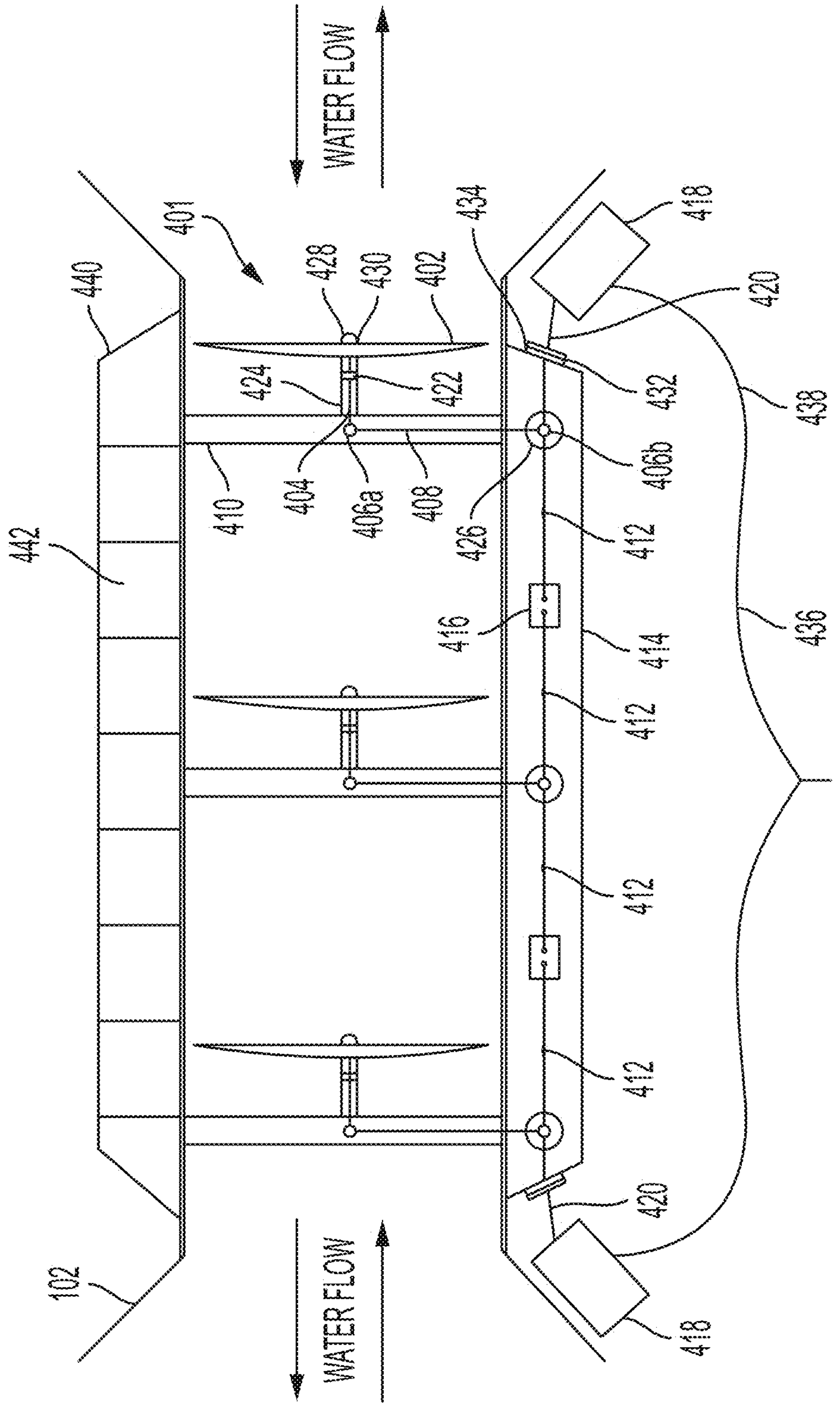
FIG. 4A illustrates a cross section view of a hydrokinetic system, according to some embodiments of the present disclosure.

FIG. 4A illustrates an example cross-section view through duct 102 to show the various mechanical components and linkages of the hydrokinetic system, according to some embodiments. The various mechanical components may not be drawn to scale and may be located in different relative positions to one another. As discussed above, the hydrokinetic system includes a series of rotors 401 disposed within the central passageway of duct 102. As a general overview, the water pressure caused by tidal and current flows will be funneled through though duct 102 and will force the rotor blades 402 on each rotor shaft 404 to rotate. These rotational speeds may be relatively low, however due to the powerful force of water flow, the torque remains high. A spur gear 406*a* may be connected to the tailing end of each rotor shaft 404 and will catch the teeth of a tensioned timing belt 408 which may be oriented perpendicular to rotor shaft 404. In some embodiments, the timing belt 408 is replaced with a drive shaft. Each timing belt 408 runs through the inside of a corresponding water-tight strut diffuser 410 and bridges a rotor shaft's rotational torque to one or more primary shafts 412. These primary shafts 412 may be located in a separate, scaled cavity 414 attached to the outside of duct 102 and running lengthwise down the side of duct 102. In some other embodiments, an annular compartment between an inner surface and an outer surface of duct 102 houses primary shafts 412 and other mechanical components coupled to primary shafts 412. In some embodiments, the majority of the mechanical linkages and other mechanical components are provided in sealed cavity 414 (or the annular compartment) to clear as much space for water to flow through duct 102. According to some embodiments, strut diffusers 410 provide structural support to the rotors 401, however they may be designed to encourage positive efficiencies as the water flows around them. Differential gear boxes 416 (herein referred to as differentials) may be provided to allow each primary shaft 412 to rotate at different speeds. It is possible that, due to the different locations of rotors 401 inside duct 102, rotors 401 may rotate at different speeds. Torque can be transferred from primary shafts 412 to one of two generators 418 via one or more output shafts 420. According to some embodiments, generators 418 are offset from primary shafts 412 and output shafts 420 are designed to allow for misalignment and vibration dampening. In some embodiments, generators 418 are located within sealed cavity 414 or within the annular compartment around duct 102. In some other embodiments, generators 418 are located separately from both duct 102 and sealed cavity 414 and can be separated from the rest of the system to be brought to the surface for maintenance or replacement. Although two generators 418 are illustrated, any number of generators can be provided on a single hydrokinetic system, including only a single generator 418.

According to some embodiments, as the tidal flows change (e.g., in speed and/or direction) the blade angle for rotor blades 402 will need to change as well to allow for optimal efficiency. A governor 422 located inside a rotor housing 424 is configured to sense blade angle and may be controlled from an onshore station. If, for example, maintenance is required for one of the rotors 401, the corresponding governor 422 can change the blade pitch of rotor blades 402 and a centrifugal clutch 426 coupled to the corresponding timing belt 408 may be configured to sense the low rpm of rotor 401 and engage a break between the corresponding timing belt 408 and output shaft 420 and/or any of primary shafts 412. Any of the primary shafts 412 can be stopped using this method while the other primary shafts 412 continue to rotate based on rotation of the other rotors. If a generator 418 is needed to be removed for maintenance, all primary shafts 412 can be halted via one or more centrifugal clutches 426 to allow for generator disengagement.

According to some embodiments, rotor blades 402 of a given rotor 401 are connected to a central hub 428 that in turn connects the rotor blades 402 to the corresponding rotor shaft 404 within rotor housing 424. A rotor bearing 430 is disposed around hub 428 and allows the rotor blades 402 to rotate freely. According to some embodiments, each rotor 401 includes 3 blades 402. The blades may have the general shape of a Kaplan blade as will be discussed in more detail herein. Each rotor blade 402 may be formed from composite materials due to their strength and low-maintenance qualities. According to some embodiments, three rotors 401 are placed within duct 102 as illustrated in FIG. 4A, however any number of rotors 401 can be used in other configurations, such as only two rotor blades as discussed with reference to FIG. 4B. According to some embodiments, the rotor blades 402 of a given rotor 401 are offset in rotational position with respect to the rotor blades of the other rotors and are positioned strategically to allow for maximum flow efficiency and power generation. The blade angle of a given set of rotor blades 402 may be altered at any time using the corresponding governor 422 to maximize performance or to stop the blades 402 from rotating. According to some embodiments, the blade angle of a given rotor blade 402 may be passively changed between two positions based on the direction of the water flow. Two separate pins or nubs on either side of the rotor blade can act as stopping points to prevent the rotor blade from rotating any further. For example, the rotor blade may be pushed against one of the pins when the water flows in one direction, and when the water changes direction, it can rotate the blade until it rests against the other pin. This allows the rotor to passively rotate to an efficient angle of attack when the flow of water changes direction. For example, the angle of attack of the blades on a first side can be 10 degrees and when the flow of water changes direction, the blades can rotate on the hub to provide an angle of attack of 10 degrees on the opposing side.

According to some embodiments, strut diffusers 410 may also house any other mechanical linkages and/or bearings. Strut diffusers 410 may be fused to the inside surface of duct 102. According to some embodiments, strut diffusers 410 are made from steel and/or composite materials and are shaped to increase the aerodynamic flow of the surrounding fluid. In some embodiments, a cooling system is included within a given strut diffuser 410 to reduce heat caused by friction from timing belt 408 and/or spur gear 406*a*.

According to some embodiments, rotor shaft 404 is a hollow drive shaft that allows for the passage of power connectors for electric blade pitch actuators configured to change the pitch and angle of rotor blades 402. In some embodiments, the size of rotor shaft 404 is minimized while maintaining a performance specification with a factor of safety of at least 1.5 to reduce overall weight and improve selection of supporting components such as seals, bearings and couplings.

According to some embodiments, centrifugal clutch 426 is configured to use centrifugal force to disengage output shaft 420 or primary shaft 412 from centrifugal clutch 426 in response to a rotational speed of the corresponding rotor 401 dropping below a threshold. In some embodiments, centrifugal clutch 426 includes its own spur gear 406*b* to engage with timing belt 408.

According to some embodiments, differential 416 is used to combine the mechanical power from two or more drive shafts rotating at different speeds. Differential 416 includes a gear train with three shafts where the rotational speed of one shaft is the average of the speeds of the others, or a fixed multiple of that average. In one example, a spur-gear differential has two equal-sized spur gears, one for each half-shaft, with a space between them. At the center of the differential 416, there is a rotating carrier on the same axis as the two shafts. Torque from a prime mover or transmission, such as from any of primary shafts 412, rotates this carrier. Mounted in this carrier are one or more pairs of pinions, generally longer than their diameters, and typically smaller than the spur gears on the individual half-shafts. Each pinion pair rotates freely on pins supported by the carrier. Furthermore, the pinion pairs are displaced axially, such that they mesh only for the part of their length between the two spur gears and rotate in opposite directions. The remaining length of a given pinion meshes with the nearer spur gear on its axle. Therefore, each pinion couples that spur gear to the other pinion, and in turn, the other spur gear, so that when a corresponding primary shaft 412 rotates the carrier, its relationship to the gears for the individual wheel axles is the same as that found in a bevel-gear differential. Any number of differentials 416 may be provided and protected within scaled cavity 414 (or within an annular compartment around duct 102).

According to some embodiments, each of generators 418 is disposed within its own pallet (e.g., an enclosed box) that can be removed from the rest of the system. The pallet can include a handle or lifting gear to provide a lifting point. A guiding and/or locking mechanism can be used to ensure that the pallet is lowered into the correct location on the system to ensure that the couplings of each generator 418 align with the corresponding output shaft 420. According to some embodiments, a coupling mechanism 432 along with a lip seal 434 provided to create a water-tight region around output shaft 420 as it couples between generator 418 and into sealed cavity 414.

According to some embodiments, one or more power cables 436 and control/sensor cables 438 are provided to deliver power from generators 418 and to provide power to various sensors and/or controllers present on the hydrokinetic system. Each of power cable 436 and control/sensor cable 438 can run parallel to one another between the hydrokinetic system and an onshore control station. According to some embodiments, control/sensor cable 438 provides power to one or more sensors such as, for example, a sensor disposed in hub 428 and configured to monitor blade angle for rotor blades 402, a sensor disposed on an interior surface of duct 102 and configured to monitor flow speed and direction of water through duct 102, a sensor disposed in strut 410 and configured to monitor the integrity of the linkage between rotor shaft 404 and timing belt 408, a sensor coupled to generator 418 and configured to monitor a performance of generator 418, a sensor disposed within scaled cavity 414 and configured to monitor the performance of any of the mechanical components within scaled cavity 414, such as primary shafts 412, differential 416, and centrifugal clutch 426, or one or more pressure and/or temperature sensors disposed throughout various portions of the hydrokinetic system. Additionally, one or more controllers may be provided to control the operation of governor 422 and/or generator 418 and these controllers receive power via control/sensor cable 438.

According to some embodiments, a second sealed cavity 440 may be affixed to another region on the outside surface of duct 102. Second scaled cavity 440 may include one or more ballast tanks 442 that can be individually filled with water or air to change a buoyancy of the overall hydrokinetic system. In some examples, both sealed cavity 414 and second sealed cavity 440 are part of the same annular compartment that runs around the outside of duct 102.

According to some embodiments, rather than use separate control/sensor cables 438 to deliver power to the sensors and/or controllers on the hydrokinetic system, the system includes one or more batteries that can be charged from the power output from generator 418. The charge from these batteries can be used to power the sensors and/or controllers on the hydrokinetic system. In some embodiments, the batteries are embedded batteries that are molded or otherwise shaped to fit within duct 102. The batteries can be included within any of sealed cavity 414, second scaled cavity 440, or an annular region around the outside of the passageway through duct 102. The batteries used on the hydrokinetic system may be absorbent glass mat (AGM) batteries or lithium-ion batteries, to name a few examples. On-demand power can be locally drawn from the batteries for a variety of applications.

Figure 4B:
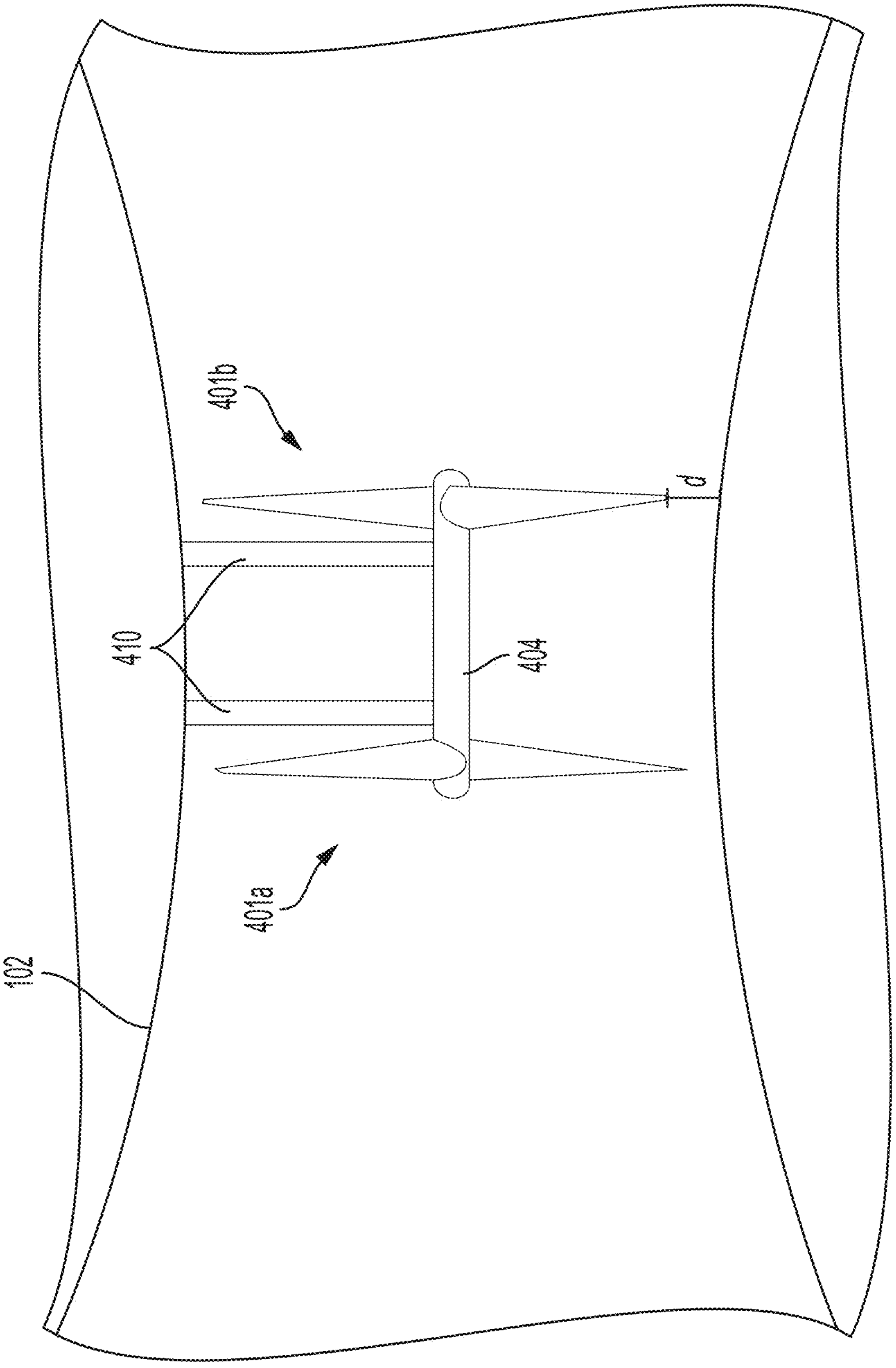
FIG. 4B illustrates a cross section view of another rotor design for the hydrokinetic system, according to some embodiments of the present disclosure.

FIG. 4B illustrates another example rotor design within duct 102 that includes a first rotor 401*a* and a second rotor 401*b*. According to some embodiments, rotors 401*a* and 401*b* are designed to rotate in opposite directions from one another. For examples, rotor 401*a* may include blades that are shaped such that rotor 401*a* rotates clockwise while rotor 401*b* includes blades that are shaped such that rotor 401*b* rotates counterclockwise, or vice versa. Using two counter-rotating rotors provides enhanced stability for the device while also improving efficiency. The two rotors may be symmetrically positioned on either side of the midpoint of duct 102. Duct 102 is illustrated in this example as having a parabolically curved inner surface that expands outwards from the midpoint of duct 102 along its length.

According to some embodiments, rotors 401*a* and 401*b* face opposite directions (due to their counter-rotating designs) and may be coupled to opposite ends of a common shaft 404. Each rotor also includes its own strut diffuser 410 coupled to common shaft 404. The mechanical design and generator coupling for each of rotors 401*a* and 401*b* may be substantially similar to that of rotor 401 as discussed above with reference to FIG. 4A. Although dimensions may vary between certain applications, in some examples, the distance between the hubs of each of rotors 401*a* and 401*b* is between 10" and 30", or between 25" and 35", such as around 30.9". In some examples, the distance between strut diffusers 410 is between about 6 inches and 2 ft, such as around 1.5 ft. Strut diffusers 410 may also each have a diameter of around 1" to 3" such as, for example, less than 1", less than 2" or less than 3". According to some embodiments, a distance d between the tip of the rotor blades of either of rotors 401*a* or 401*b* and the inner surface of duct 102 is between about 0.5" and 5", such as around 2", less than 2", or less than 1".

Figure 5:
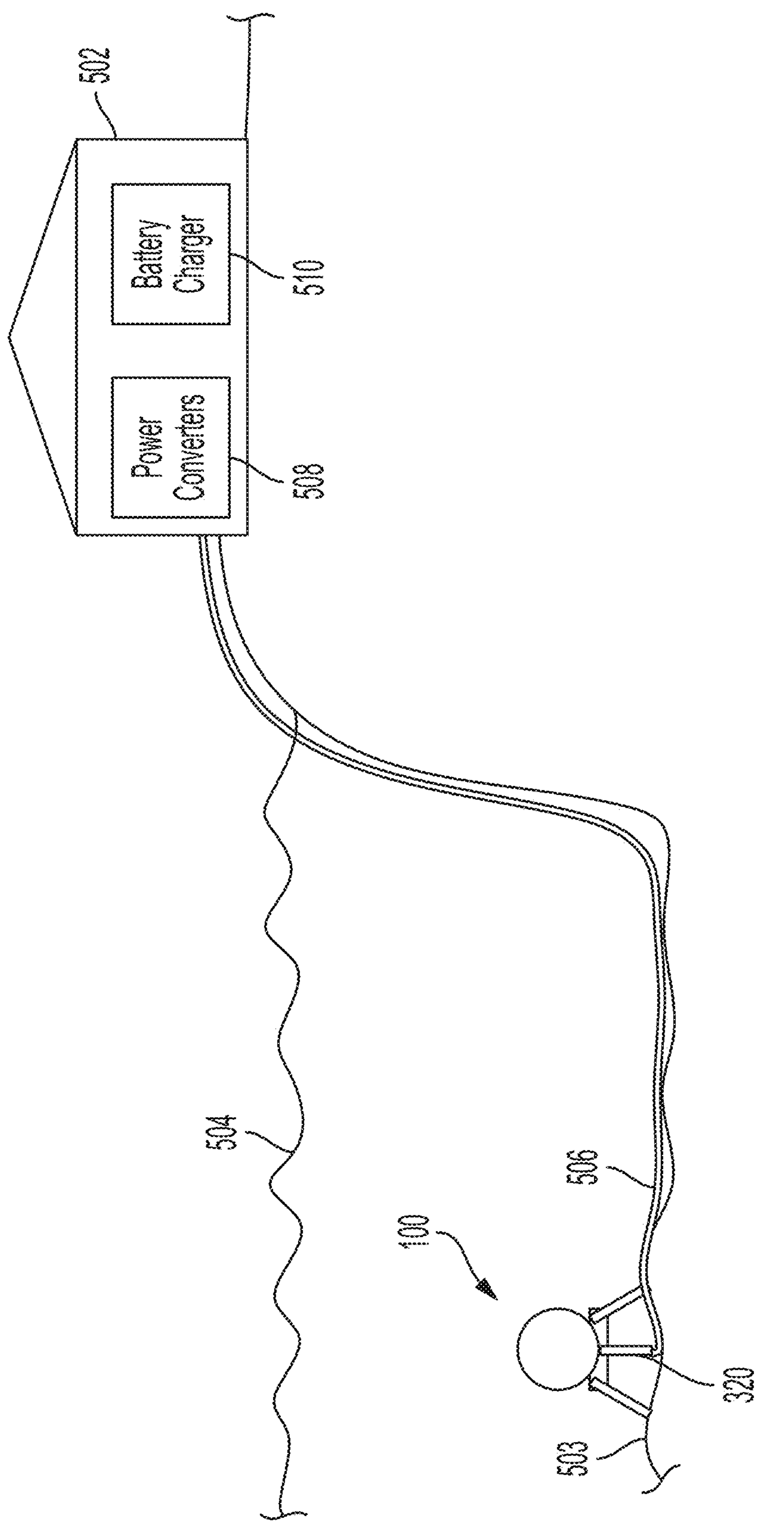
FIG. 5 illustrates the connection between a hydrokinetic system deployed on an underwater floor and a control station on land, according to some embodiments of the present disclosure.

FIG. 5 illustrates an example hydrokinetic electrical system that involves hydrokinetic system 100 producing electrical energy based on the movement of water through the system and an onshore control station 502 that receives the electrical energy produced by hydrokinetic system 100. According to some embodiments, hydrokinetic system 100 is anchored to an underwater floor 503 beneath the water's surface 504. One or more cables 506 are fed from hydrokinetic system 100 through hollow piling 320 and along the underwater floor 503 until they are received at control station 502. As discussed above, the cables 506 may include both power cables to provide electrical power generated from one or more generators on hydrokinetic system 100 and/or control/sensor cables that provide power and control signals to various sensors and/or controllers on hydrokinetic system 100.

Each of the one or more generators present on hydrokinetic system 100 may be configured to produce 120 volt alternating current (AC) that is provided via the power cable in one or more cables 506 to control station 502. As part of the power generation unit on hydrokinetic system 100, one or more voltage regulators may be provided to maintain a constant voltage output.

According to some embodiments, control station 502 provides a user interface for the operations of hydrokinetic system 100. According to some embodiments, control station 502 also functions to receive, store and distribute the electrical power coming from hydrokinetic system 100 via the one or more underwater cables 506. Control station may also collect information from various sensors monitoring environmental, mechanical and electrical data such as ocean currents, revolutions per minute of each rotor and electrical output via the one or more underwater cables 506. In some embodiments, operators can monitor and operate hydrokinetic system 100 either from one or more terminals directly onsite (e.g., in control station 502) or remotely through a computing device and a wireless connection such as cellular, WIFI, 4G, 5G, or Bluetooth.

According to some embodiments, control station 502 includes any number of power converters 508 to convert electrical energy between AC and DC power. For example, some power converters 508 may be used to convert the AC power received from hydrokinetic system 100 into DC power for storing in one or more storage devices (e.g., batteries). In another example, some power converters 508 may be used to convert the DC power stored in the one or more storage devices back into AC power before being distributed onto an electrical grid or directly to a customer. Such power converters 508 that convert from DC power to AC power are sometimes referred to as inverters. According to some embodiments, one or more battery chargers 510 may be designed to receive DC power from the power converters 508 and charge one or more storage devices using the received DC power. The charging protocol depends on the type and size of the storage devices being charged.

According to some embodiments, control station 502 includes one or more computing devices with a touchscreen display or other type of user interface to allow an operator to monitor the health of one or more components of hydrokinetic system 100. The interface may include an emergency or manual braking function to slow or stop the rotation of any of the rotors within hydrokinetic system 100. In some embodiments, an operator may be alerted if any alarms are set off, such as for an overheating generator, a brake failure, an electrical failure, a rotor failure, etc. Diagnostic details collected from a variety of sensors or controllers may be provided via the touchscreen display or other type of user interface. Such sensors/controllers may include acoustic sensors, vibration sensors, brake condition sensors to monitor a condition of the rotor brakes, a battery monitor to provide diagnostic information about the storage devices such as charging rate, charging current, and battery voltage, a battery controller to protect the storage devices from overcharging and control charging rates, and an acoustic Doppler current profiler sensor to anticipate maximum and minimum potential current values, to name a few examples.

Figure 6:
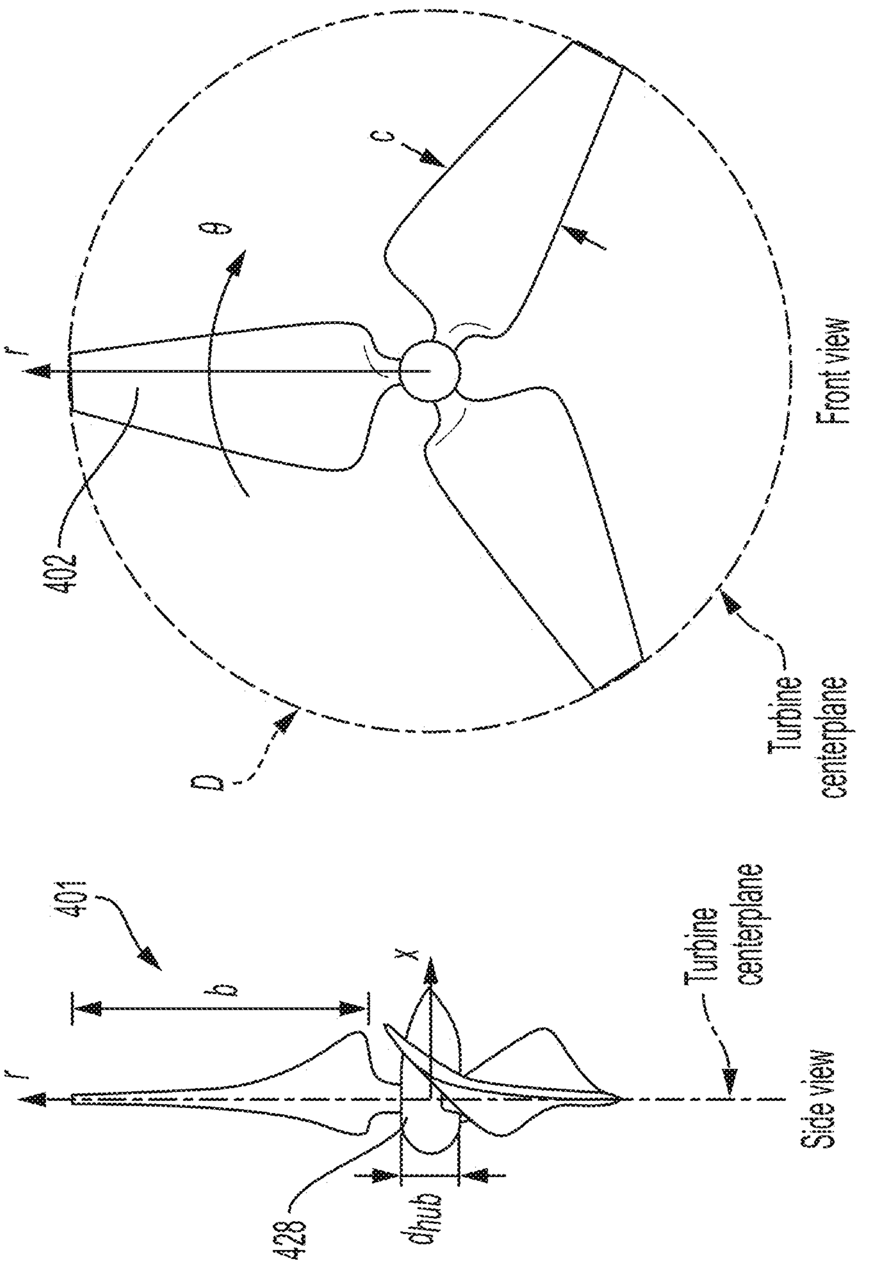
FIG. 6 illustrates an example rotor blade design for a hydrokinetic system, according to some embodiments of the present disclosure.

FIG. 6 illustrates example geometrical details for rotor 401, and more particularly for the shape of rotor blades 402, according to some embodiments. Each rotor 401 may be designed to have three identical rotor blades 402 extending radially from hub 428. In some examples, rotor blades 402 may have a chord-to-diameter ratio (c/D) between about 0.225 and about 0.275 at the root and between about 0.050 and about 0.100 at the tip. In another example, rotor blades 402 have a blade-length to diameter ratio (b/D) between about 0.2 and about 0.6 from the root to the tip. In another example, the ratio between hub 428 diameter ($d_{hub}$) and the rotor diameter (D) is between 0.075 and 0.100. In some embodiments, hub 428 has a diameter ($d_{hub}$) that is less than 10% of the diameter (D) of the rotor 401, such as around 7% of the diameter (D) of the rotor 401. In some examples, $d_{hub}$ is between about 3" and about 5", such as around 3.9".

As discussed previously, the duct of the hydrokinetic system can have several possible sizes. The larger ducts (e.g., on the order of tens of feet in diameter) may be used for more permanent hydrokinetic systems, and may be anchored in place (using, for example, anchoring structure 104) to provide power over the course of several weeks or even years. However, smaller hydrokinetic systems (e.g., with ducts having a diameter between about 1-3 feet) can provide portable (e.g., able to be carried by 1-2 people) power generators for on-demand power applications and/or temporary power generation. Such smaller hydrokinetic systems can be deployed quickly in shallower water (such as a river, stream, or lake) and removed quickly, which makes them useful for covert operations or any applications that require quick, temporary power close to a water source.

FIGS. 7A-7M illustrate various views of a hydrokinetic system 700 using a smaller duct design (e.g., less than 2 feet in diameter), according to some embodiments. The electrokinetic mechanisms (e.g., rotors, mechanical linkages, etc.) within hydrokinetic system 700 may be similar to those described above for the larger hydrokinetic system 100, but with scaled-down dimensions. However, other aspects of the design of hydrokinetic system 700 may be different to take advantage of its smaller size and portability. Some of these other aspects include an anchoring system that provides both stability for hydrokinetic system 700 and adaptability to allow hydrokinetic system 700 to flip 180 degrees within the water, if desired.

Figure 7A:
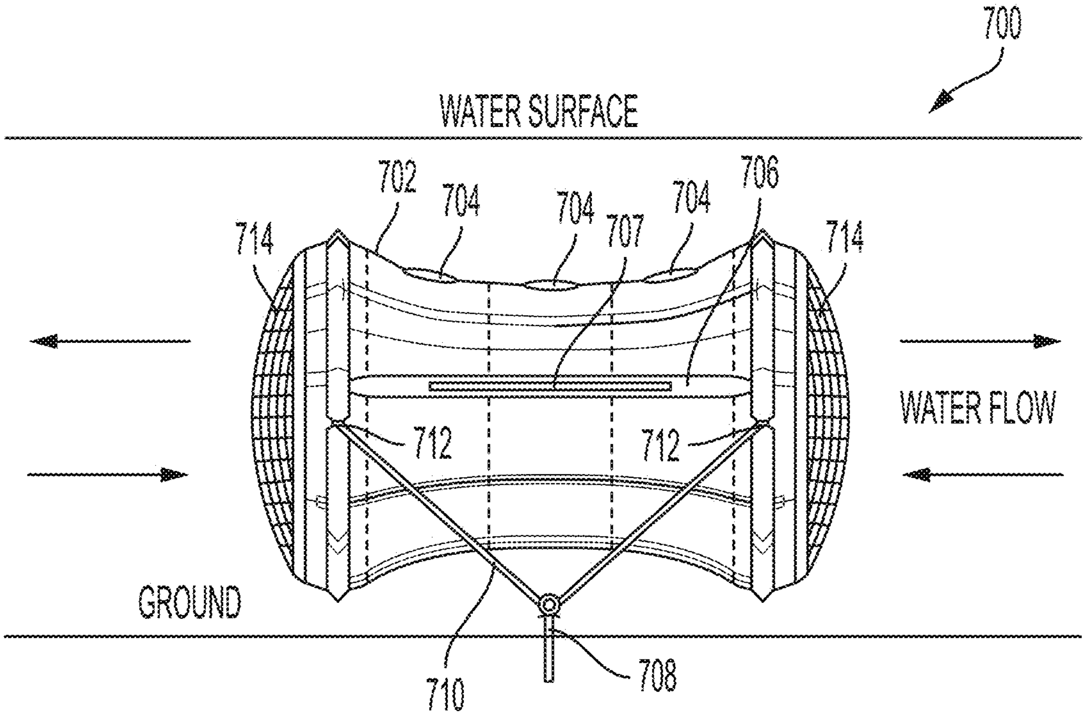
FIGS. 7A-7M illustrate various views of a portable hydrokinetic system, according to some embodiments of the present disclosure.

FIG. 7A illustrates a side view of hydrokinetic system 700, according to some embodiments. Like the larger version, hydrokinetic system 700 includes a duct 702 to allow water to pass through duct 702 and turn one or more rotors disposed within duct 702. Duct 702 includes a passageway connected between two openings at either end. The diameter of each opening of duct 702 is larger than a diameter of a midpoint of the passageway connecting the two openings. In some embodiments, duct 702 has a similar shape to duct 102 described with reference to FIG. 2. However, in some other embodiments, duct 702 has a shape similar to that illustrated in FIG. 7A with a continuous curved (e.g., parabolically curved) surface between both openings at either end of the passageway. In still other embodiments, duct 702 has a curved inner surface to form the passageway between the openings, but a straight outer surface between the openings. Duct 702 may be formed from any lightweight and sufficiently rigid materials, such as composite materials, mild steel, or stainless steel.

A plurality of pallets 704 each holding an electrical generator are disposed along a particular portion of duct 702, according to some embodiments. The plurality of pallets 704 may be arranged in a row and any number of pallets (including only one) can be provided. Each pallet can be easily inserted and removed to provide quick and easy access to the electrical generators within each pallet. The electrical generators may function in the same way as described above for hydrokinetic system 100. Any of plurality of pallets 704 may include a handle or some other lifting point to facilitate the insertion and removal of each pallet 704. In some embodiments, any of pallets 704 holds one or more rechargeable batteries that can be charged from the electricity generated by hydrokinetic system 700.

According to some embodiments, a platform 706 is provided along a length of duct 702 between each opening. Platform 706 runs along a portion of the length and extends outwards away from duct 702. In some embodiments, duct 702 includes two identical platforms 706, one on either side of duct 702. Platform 706 may include an aerodynamic design to provide stabilization of duct 702 once it has been placed underwater. Additionally, platform 706 may provide a gripping point to help carry duct 702. In some embodiments, platform 706 includes a fin 707 that extends along a portion of platform 706. Fin 707 may be provided for increased stabilization of duct 702 once it has been placed underwater. In some embodiments, fin 707 is retractable and can be retracted back into platform 706 during storage and transport and extended outward after duct 702 has been placed underwater to provide enhanced stabilization.

According to some embodiments, duct 702 is held beneath the water's surface using an anchor 708, such as a spiral anchor, that is drilled into the ground. A cable 710 loops through anchor 708 or is otherwise attached to anchor 708 and runs out to two or more coupling points 712 on duct 702. Coupling points 712 may be disposed along a same horizontal plane along a length of duct 702. In some embodiments, each coupling point 712 is located near a corresponding end of duct 702 to give cable 710 a wider angle from anchor 708 to increase stability.

According to some embodiments, each of the two openings of duct 702 are covered with a grating 714 to protect the rotors inside of duct 702. Grating 714 can have a convex shape, as illustrated, to passively cause debris to slide away from the openings of duct 702 after contacting grating 714. In some embodiments, grating 714 includes a repeating pattern, such as a repeating square pattern, repeating diamond pattern, or a repeating triangular pattern. Grating 714 can be made from stainless steel, although any other sufficiently rigid material with good anti-biofouling properties may be used as well. In some embodiments, grating 714 is flexible enough to be inverted into a concave shape that bends inwards towards the center of duct 702.

Figure 7B:
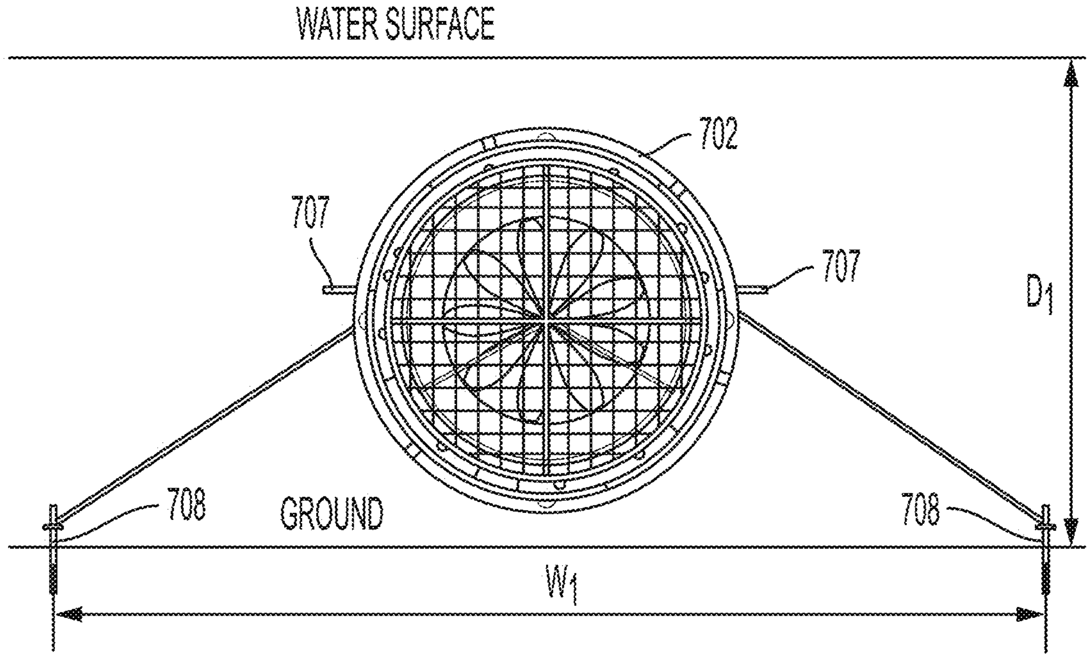
Figure 7C:
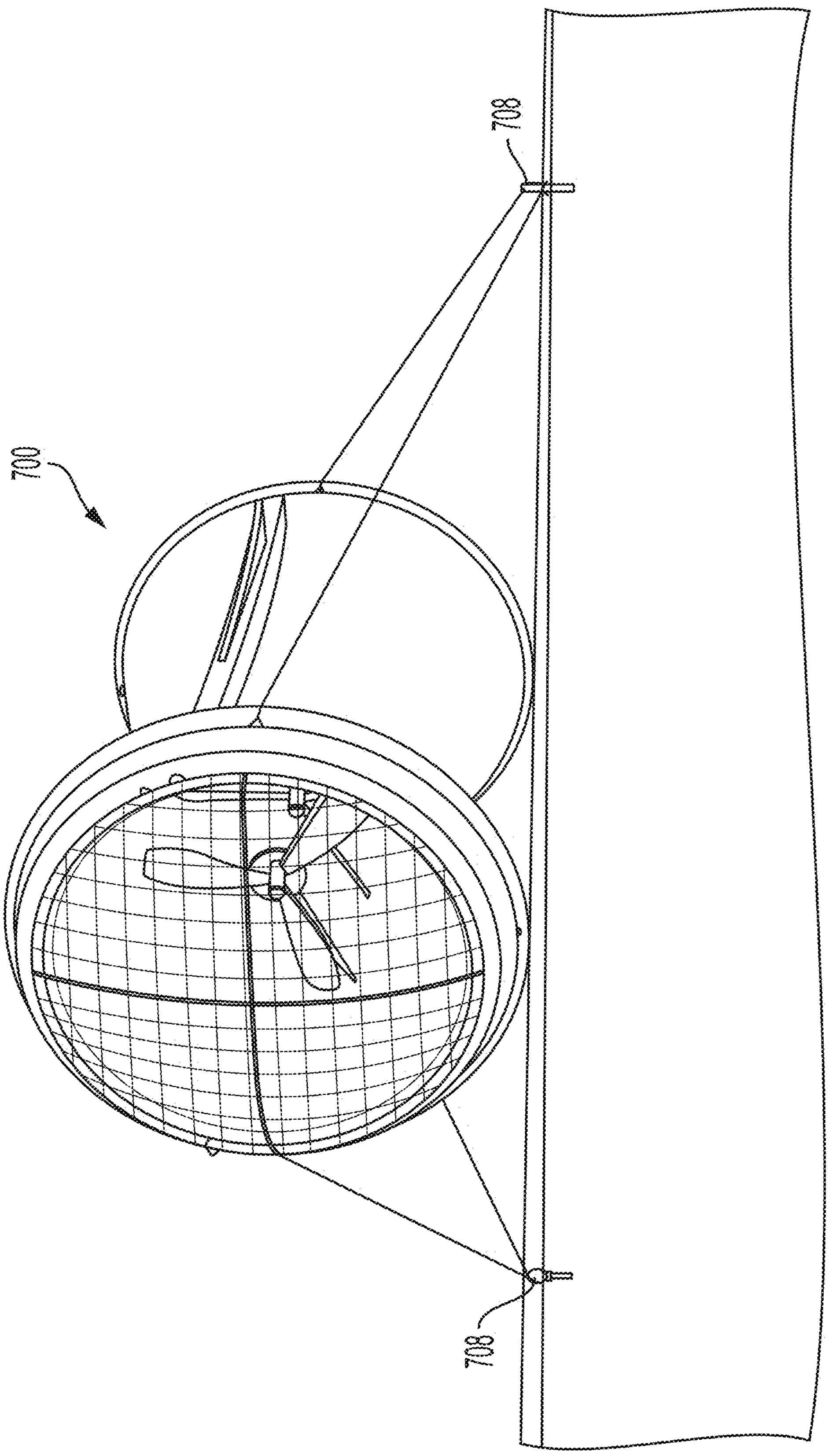

FIG. 7B illustrates a different view of hydrokinetic system 700 by looking through the passageway of duct 702, according to some embodiments. Fins 707 are extended on either side of duct 702 to help stabilize duct 702 under the water's surface, according to some embodiments. Two anchors 708 may be used on either side of duct 702 to maintain the position of duct 702 under the water's surface. According to some embodiments, duct 702 may be placed into an underwater environment having a depth $D_1$ between about 2 feet and about 3 feet (e.g., 2.35 feet). Duct 702 may be anchored to the ground using anchors 708 that are spaced apart by a distance WI between about 4 feet and about 5 feet (e.g., 4.81 feet). FIG. 7C illustrates another view of hydrokinetic system 700 showing both anchors 708 tethering the duct 702 into place beneath the water's surface.

Figure 7D:
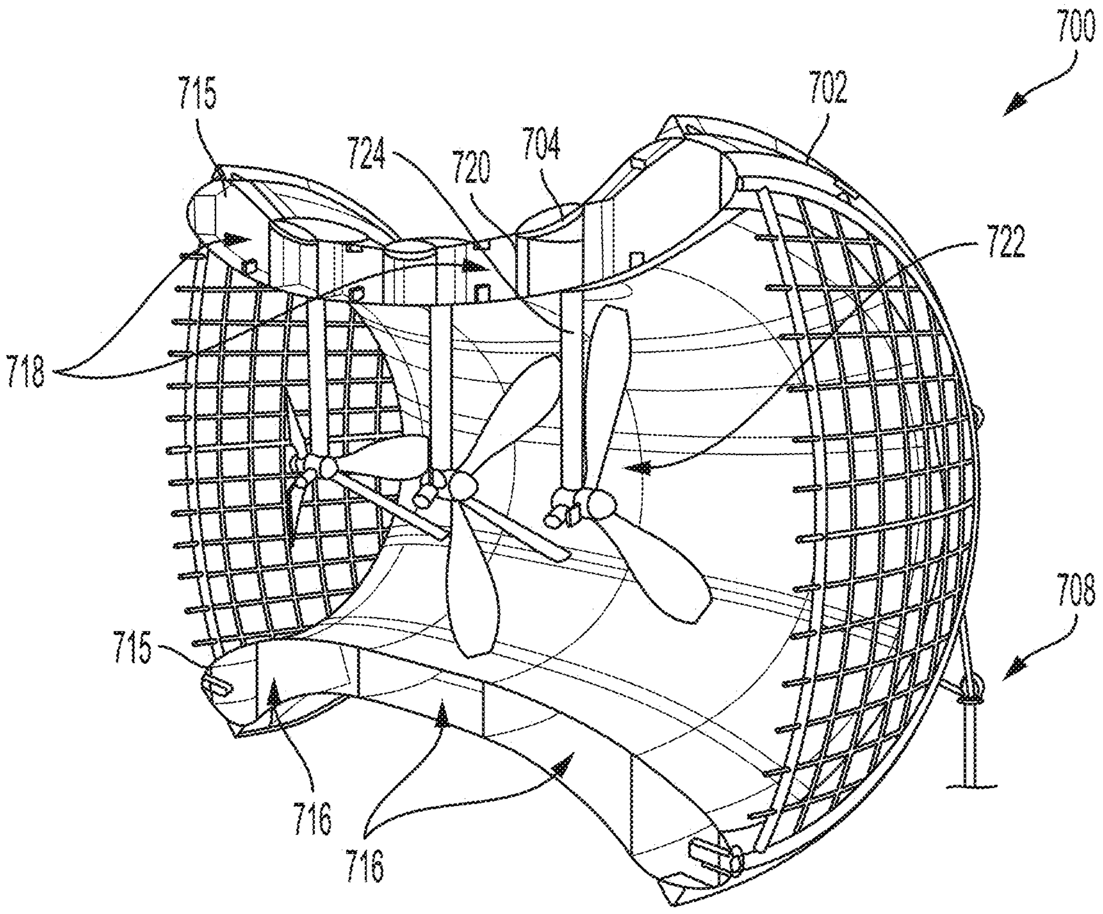

FIG. 7D illustrates a cross-section view of duct 702, according to some embodiments. Similar to duct 102 described above, duct 702 may have an annular compartment 715 that wraps around the passageway and holds a variety of mechanical components or other elements discussed herein. For example, annular compartment 715 may include one or more ballast tanks 716 that can be individually filled with air or water to affect the buoyancy of duct 702. In some embodiments, annular compartment 715 also includes chambers 718 that remain filled with air. Depending on what chambers or ballast tanks are filled with air or water, the buoyancy of duct 702 can be changed such that duct 702 floats just below the surface of the water. In some embodiments, any of ballast tanks 716 can be filled with water to cause duct 702 to tip forwards or backwards, thus causing the entire duct 702 to flip 180 degrees in the water consequently reversing the orientation of duct 702 along the direction of the water flow. In some embodiments, any of ballast tanks 716 can be filled with water to adjust the location of duct 702 to any position within the water column below the surface. Ballast tanks 716 can also be used to control the angle of duct 702 to the flow of water. For example, ballast tanks 716 can adjust the angle of duct 702 to +/−10 degrees of horizontal. Ballast tanks 716 can also be adjusted to compensate for changes in water density, for example, due to changes in salinity or temperature. In this manner, the buoyant force on the anchor(s) or tether(s) can be kept constant.

Annular compartment 715 also includes one or more hollow recesses 720 for the placement of pallets 704 into corresponding recesses 720, according to some embodiments. As discussed above, pallets 704 may house electrical generators or batteries for storing the energy generated by hydrokinetic system 700. Within the passageway of duct 702, one or more rotors 722 are suspended via one or more struts 724 that are connected to an inner surface of duct 702. The operation and design of rotors 722 may be similar to that of rotors 401 from hydrokinetic system 100. Although three rotors are illustrated, hydrokinetic system 700 may include only two rotors mounted and designed to rotate in opposite directions as discussed above with reference to FIG. 4B.

According to some embodiments, hydrokinetic system 700 is capable of generating local power at any destination with a moving body of water or with tidal currents. This locally generated power can then be directly offloaded to any number of other underwater or above-water seacraft via underwater connectors or other electrical connectors. Furthermore, the power can be delivered via one or more power cables to any on-shore location.

Figure 7E:
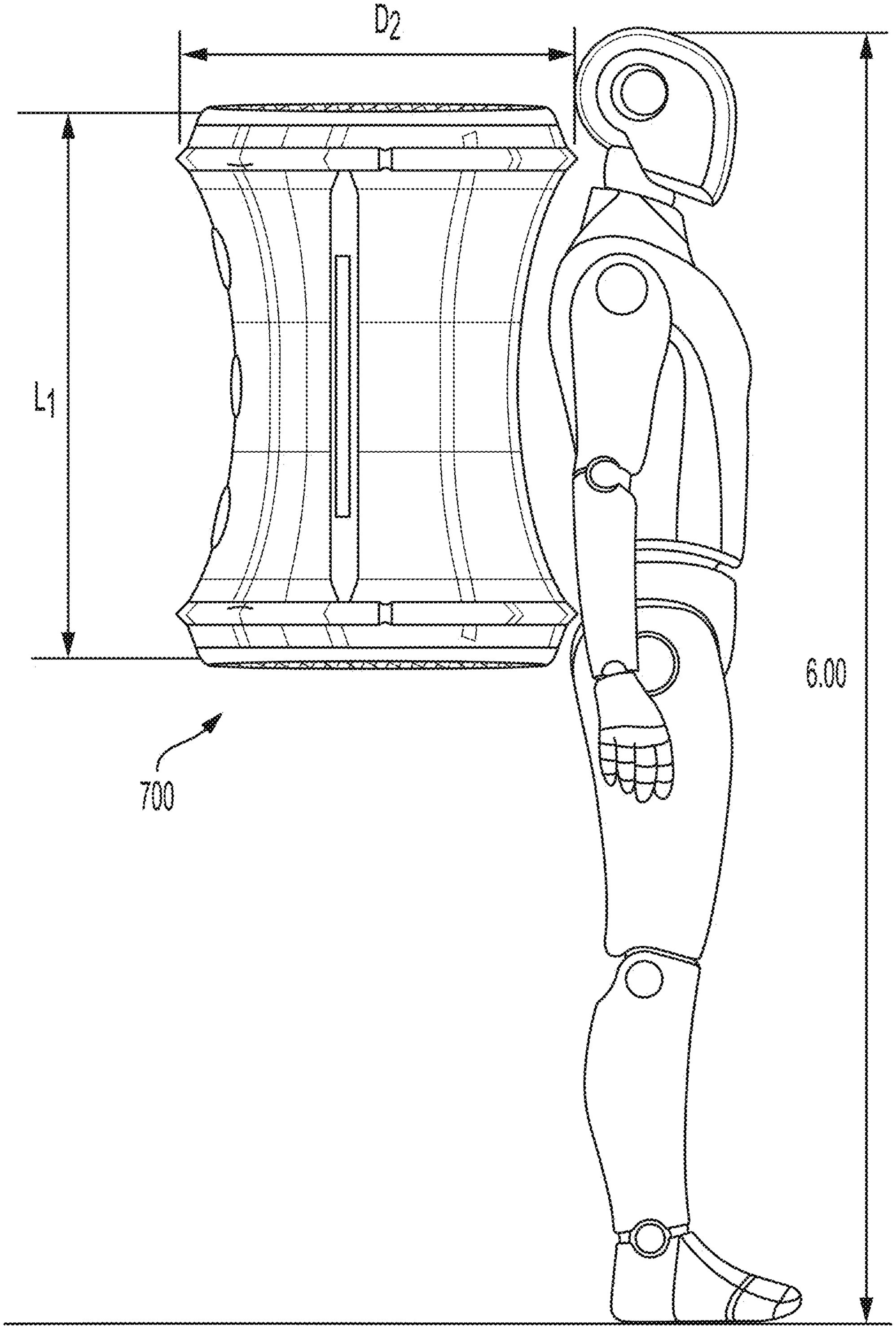

FIG. 7E illustrates the size of hydrokinetic system 700, according to some embodiments. In some examples, hydrokinetic system 700 has a length ($L_1$) between about 2 feet and about 3 feet (e.g., 2.55 feet) and a full diameter ($D_2$) between about 1.5 feet and about 2 feet (e.g., 1.85 feet). According to some embodiments, hydrokinetic system 700 is sized to fit comfortably onto the back of an adult (having a height of around 6 feet, for example) for easier transport in difficult to reach locations.

Figure 7F:
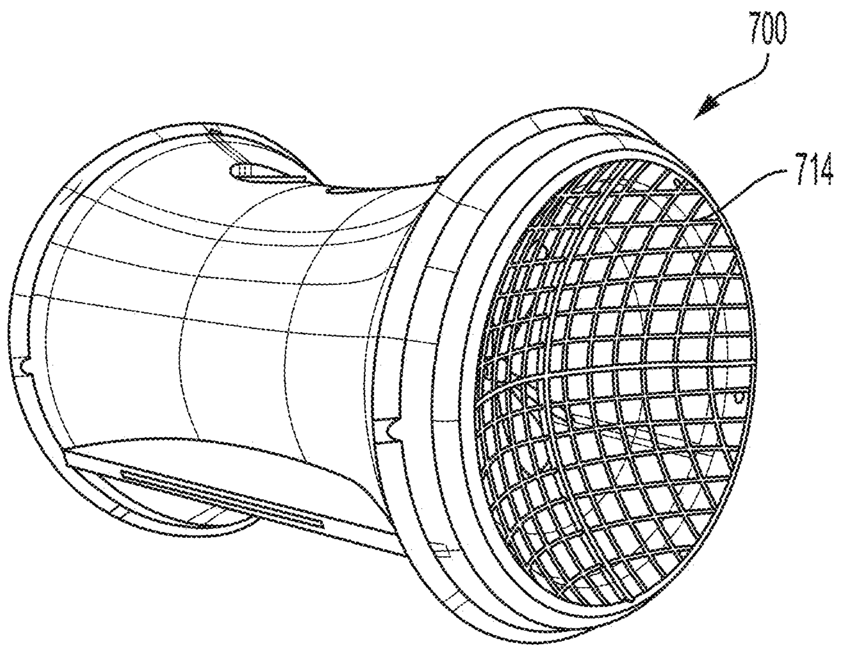

FIG. 7F illustrates another view of hydrokinetic system 700 with grating 714 inverted to create a concave shape, according to some embodiments. Gratings 714 may be inverted to make hydrokinetic system 700 easier to transport.

Figure 7G:
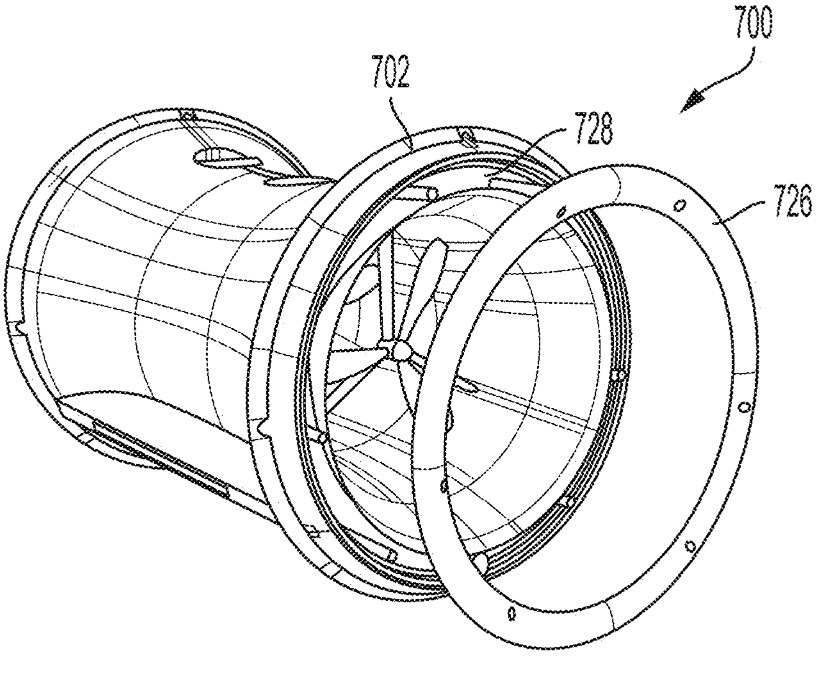

FIG. 7G illustrates another view of hydrokinetic system 700 where a rim cover 726 is removed from one end of duct 702, according to some embodiments. Rim cover 726 may be screwed on to a given end of duct 702 with a same rim cover on the opposite end as well. Either or both rim covers may be removable to reveal an annular recess 728 that can be used to hold cables or any other items. In some embodiments, rim cover 726 is removed by unscrewing the various screws holding rim cover against the end of duct 702. In some other embodiments, rim cover 726 is snapped into place over the end of duct 702 and can be popped off with a sufficient amount of applied force to reveal annular recess 728.

Figure 7H:
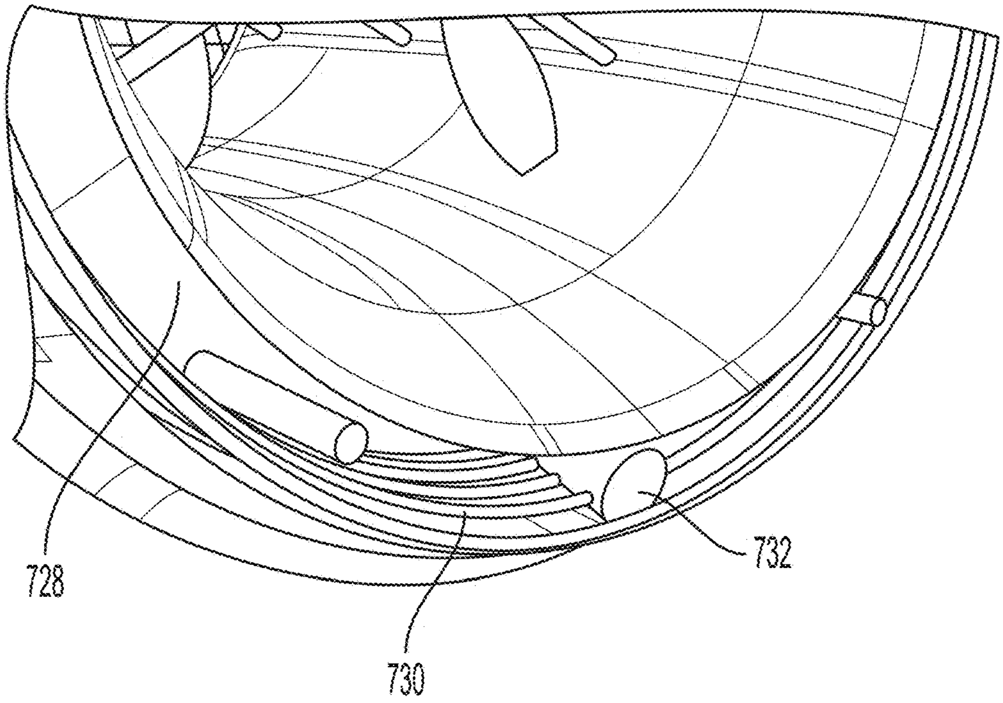
Figure 7I:
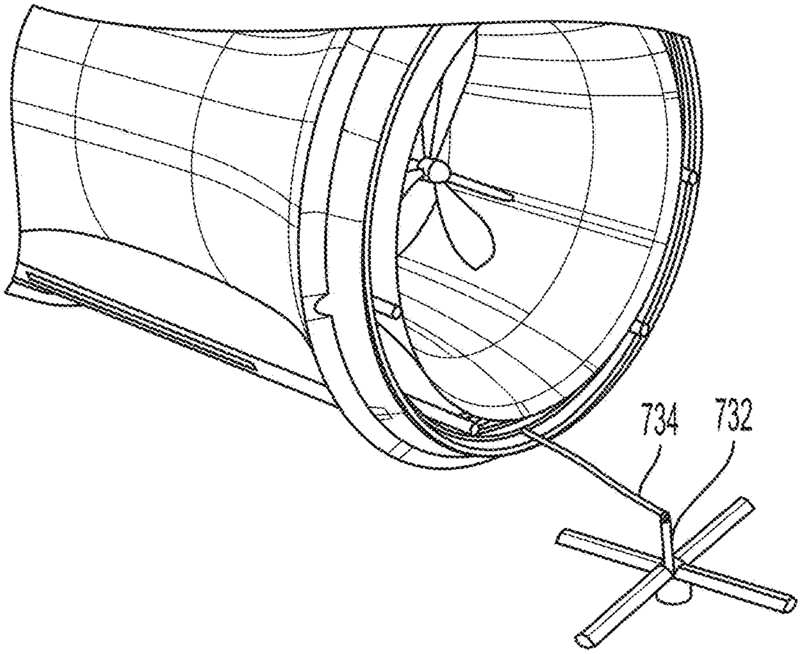

FIG. 7H illustrates a view inside annular recess 728 where one or more cables 730 are stowed, according to an embodiment. In some examples, one or more cables 730 includes a cable connected to an anchor 732 that can be pulled out and driven into the ground. FIG. 7I illustrates how an anchoring cable 734 can be paid out from within annular recess 728. According to some embodiments, anchoring cable 734 has anchor 732 connected to one end such that it can be quickly pulled out away from annular recess 728 and deployed into the ground while still attached to anchoring cable 734. According to some embodiments, the other end of anchoring cable 734 can be attached to any anchoring point 712 on duct 702. One or more cables 730 may also include a power cable that can be paid out from annular recess 728 and used to provide power (generated by any of the one or more electric generators on hydrokinetic system 700) to any onshore device.

Figure 7J:
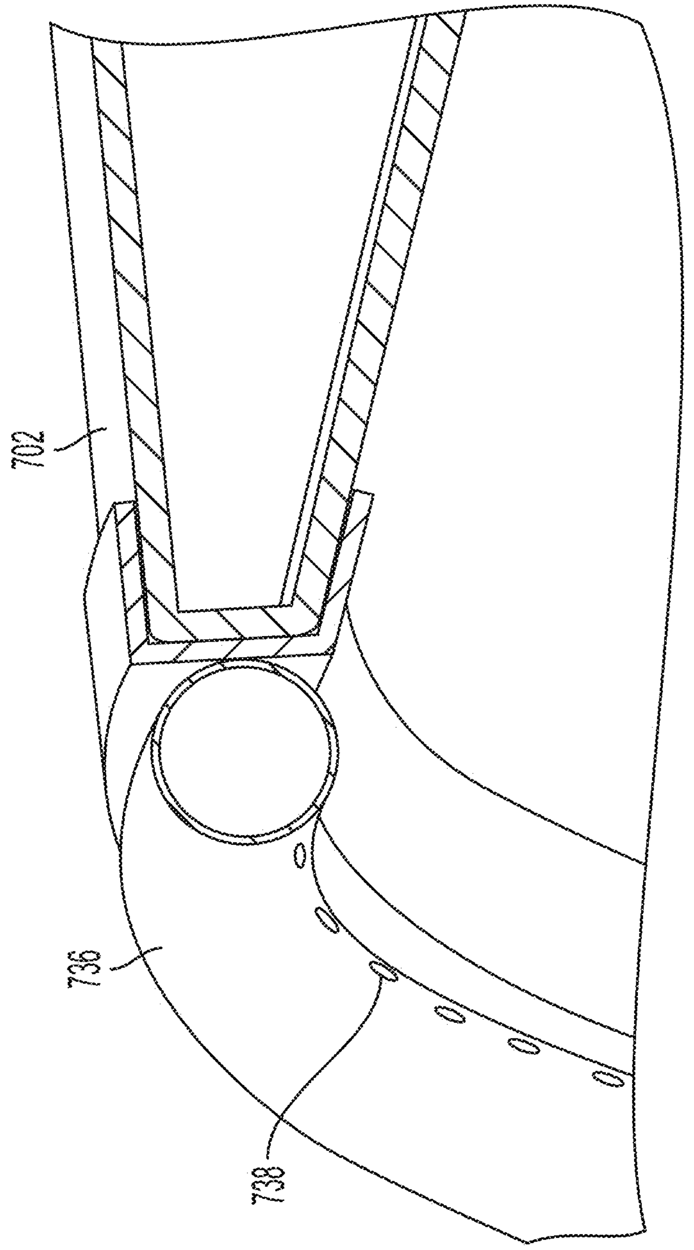

FIG. 7J illustrates a closer view of the edge of one of the openings of hydrokinetic system 700, according to an embodiment. At either end or both ends of duct 702, a hose 736 can extend around at least a portion of the circumference of the opening. The hose can be used to dispense a biocide that can be generated on board. Hose 736 may have a wall thickness of around ⅜" and a tubing diameter of, for example, from ¼ inch to 2 inches. Hose 736 can include openings 738 or can be porous. The openings or porosity can extend around the entire circumference or only one or more portions thereof. Hose 736 can be comprised of metal or polymer and may be painted, anodized or coated with a material such as SerpentScale EPDM granules. Preferred materials for the hose include those that are resistant to chlorine and hypochlorite such as halogenated polymers including, for example, PTFE, PFA, CPVC and E-CTFE.

Hose 736 can provide fluid communication from a biocide source to the interior surface of the duct, to the rotors, the struts, or any parts of the device that are susceptible to biofouling. The biocide source can be a reservoir of biocide or can be a biocide generator. In some embodiments, the biocide is generated from seawater and can be, for example, a chlorine compound such as chlorine gas, hypochlorite ion or hypochlorous ion, each of which can be electrolyzed from sea water and is an effective marine biocide. Electrolyzed seawater can be produced using electricity from the generators on board or can be produced using stored power, such as from batteries or capacitors. In a specific example, sodium hypochlorite is produced directly from seawater using a titanium electrode. At the same time, hydrogen gas can be electrolyzed and can be stored or vented. Upon production of the chlorine compound in seawater, the compound can be distributed immediately or can be stored and released at a later time.

As used herein, a compound provides a "biocidal effect" if biological growth such as algae, slime and barnacles is prevented or retarded when compared to treatment with ambient seawater. Chlorine compound is provided at a concentration high enough to provide a biocidal effect on one or more portions of the device when bled into water passing through the duct. For example, the concentration of the chlorine compound upon production can be greater than 100 mg/L, greater than 1000 mg/L or greater than 10,000 mg/L. The concentration of the chlorine compound after dispensing into the seawater and measured 1 foot downstream of hose 736 can be greater than 0.1 mg/L, greater than 0.5 mg/L, greater than 1 mg/L or greater than 2 mg/L. To improve contact time with the various surfaces of the device, the chlorine compound can be dispensed at times when the water flow through the duct is not at a maximum. For example, the chlorine compound can be dispensed when the flow rate through the duct is less than 1 m/s, less than 0.5 m/s or less than 0.1 m/s. In tidal applications, these slow flow rates can be found around slack tide. As tides and currents are accurately predicted, the chlorine compound can be generated and dispersed on a pre-planned schedule to take advantage of low flow conditions.

Biofouling can also occur in fresh water, and in fresh water applications where salt water is not available, a reservoir of salt or brine can be included on board to provide a source material for chlorine compound production. Using the brine as a chloride source, the chlorine compound can be electrolyzed using a method similar to that used in seawater. The power can be provided by the hydrokinetic system and dispensing can occur as it does in seawater. In embodiments where the device is flipped intermittently to change direction and release ensnared materials, the release of chlorine compound can be coordinated with the repositioning so that much or all of the device is exposed to a level of the chlorine compound that provides a biocidal effect.

Figure 7K:
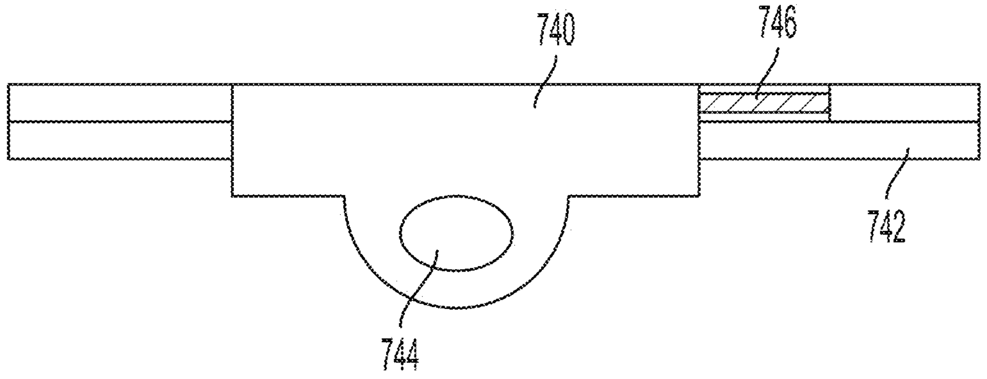

According to some embodiments, cable 710 may connect to a single coupling point (rather than two coupling points as illustrated in FIG. 7A) that can move along a track down the length, or a portion of the length, of duct 702. The single movable coupling point allows duct 702 to flip or rotate underwater while still remaining anchored to the ground. Duct 702 may include at least two such coupling points on opposite sides of duct 702. FIG. 7K illustrates a slidable coupling point to be arranged on the side of duct 702, according to an embodiment. A carriage 740 is designed to laterally slide across a bracket 742, such as a T-shaped bracket or any other suitable shape. According to some embodiments, carriage 740 includes a loop 744 through which cable 710 can be attached. In some embodiments, carriage 740 can freely slide across bracket 742 based on forces tugging on the cable passing through carriage 740. In some embodiments, a screw mechanism 746 is provided to move carriage 740 across bracket 742. Screw mechanism 746 may be actuated using power drawn from any of the generators on hydrokinetic system 700.

Figure 7L:
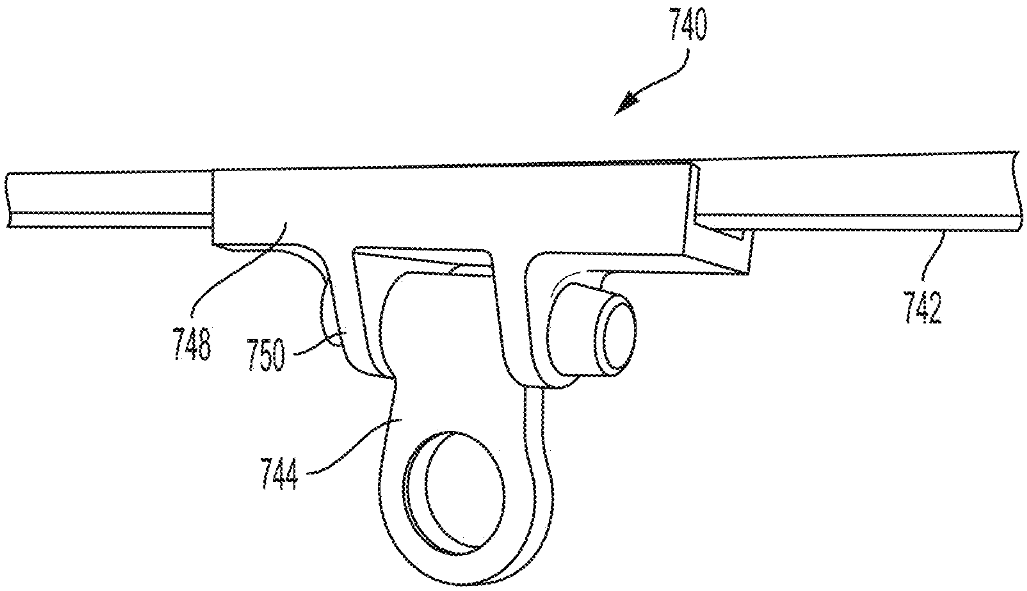

FIG. 7L illustrates another view of carriage 740 coupled to bracket 742, according to an embodiment. Carriage 740 may include a body 748 having a shape that clamps around bracket 742 and allows body 748 to slide laterally across bracket 742. Coupled to body 748 may be two or more moorings 750 through which loop 744 may be rotatably attached to. In some examples, loop 744 is free to rotate about an axis passing through the center of each of moorings 750.

Figure 7M:
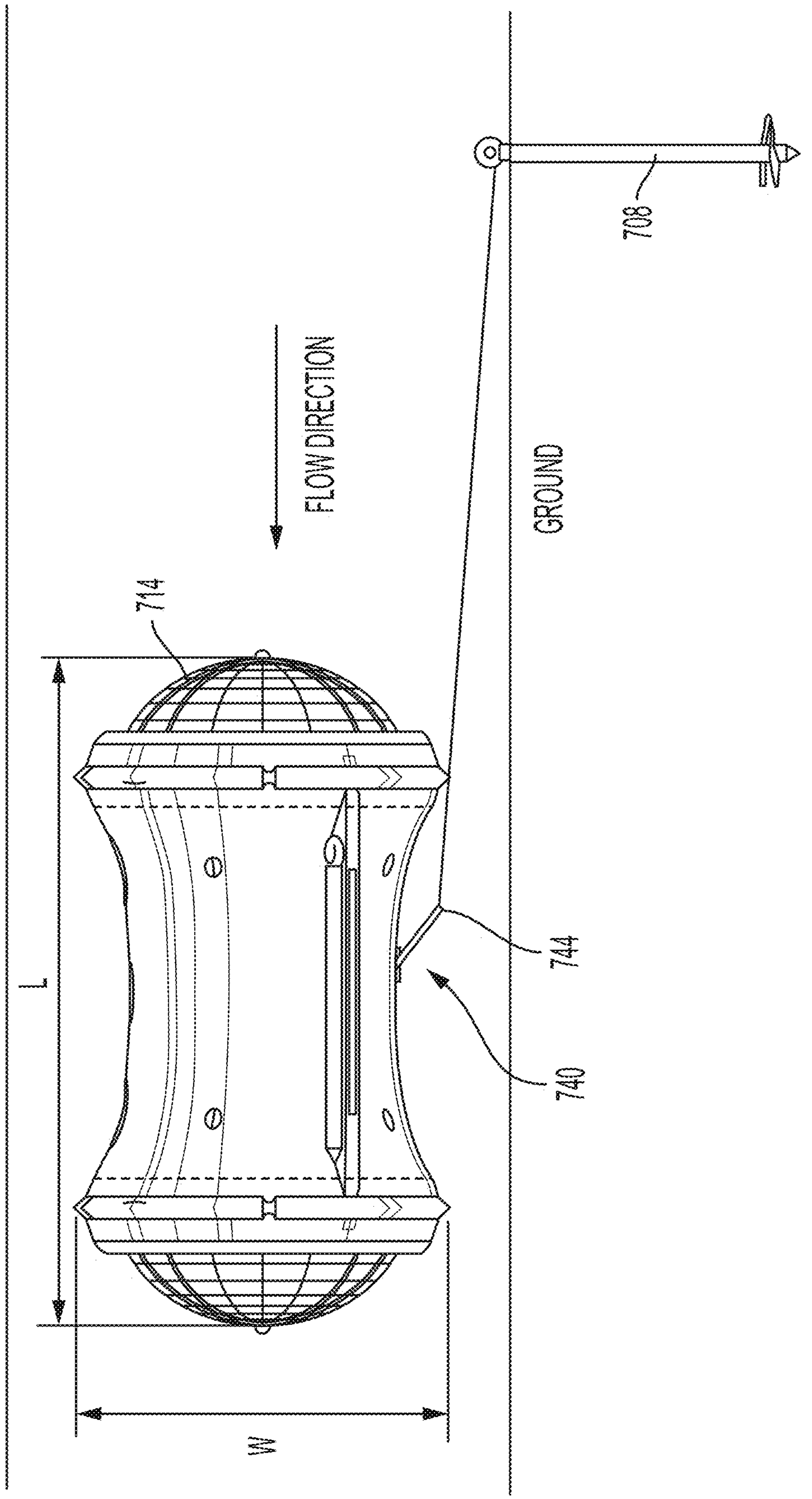

FIG. 7M illustrates another view of a hydrokinetic system 700 that uses a single coupling point on its underside to a single anchor 708, according to an embodiment. According to an embodiment, a cable is tied to the end of loop 744, which is a part of carriage 740. As discussed above with reference to FIGS. 7K and 7L, carriage 740 may be translated along the bottom of duct 702. By changing the position of the cable coupling point, duct 702 can become unstable and flip around 180 degrees in the water. For instance, carriage 740 can be translated along the surface of duct 702 to the point at which the center of lateral plane shifts to the other side of carriage 740, causing the duct to be most stable in a direction 180 degrees from its original position. This can be very useful to help clear away any blockages that may exist against grating 714. According to some embodiments, anchor 708 is a helix anchor, such as the helix anchor provided by Eco-Mooring (Milford, NH). A similar process can be performed using two anchor lines and two anchoring points wherein both anchoring points are moved longitudinally until the device flips to 180 degrees from its original position. According to some embodiments, the length L of duct 702 is between about 0.7 m and about 1.3 m, such as around 1 m. According to some embodiments, the full width W of duct 702 is between about 0.4 m and about 0.7 m, such as around 0.57 m.

In some embodiments, hydrokinetic system 700 can be anchored to any surface instead of the ground. For instance, one or more anchors can be secured to the underside of floating ice in polar regions. This can allow hydrokinetic system 700 to be maintained at a constant depth from the surface, regardless of how deep the water may be. Hydrokinetic system 700 will maintain that depth and its relative location with regard to the ice. Retaining lines may be drilled into the ice from below or cables can be passed completely through the ice and maintained with, for example, a T or mushroom anchor feature on the upper ice surface.

In some situations, hydrokinetic system 700 may be dropped into a body of water from the air (such as from a helicopter or other aircraft). Accordingly, duct 702 and the rotor mechanics are designed to survive the impact of duct 702 hitting the surface of the water after being dropped from the air. According to some embodiments, the anchoring cable may be spooled around the outside surface of duct 702. The anchoring cable may then naturally unspool from around duct 702 after it has been placed in the water. The weight of the anchor continues the unspooling motion until the anchor embeds into the underwater floor, according to some embodiments. Typically, an unspooling embodiment involves a single anchor line and single anchor. Anchor line length can be chosen exactly if the depth of the drop zone is known. In other cases, an anchor line long enough to embed the anchor in the floor is provided and the actual position of the device in the water column can be adjusted using one or more of the fins or ballast tanks.

Figure 8:
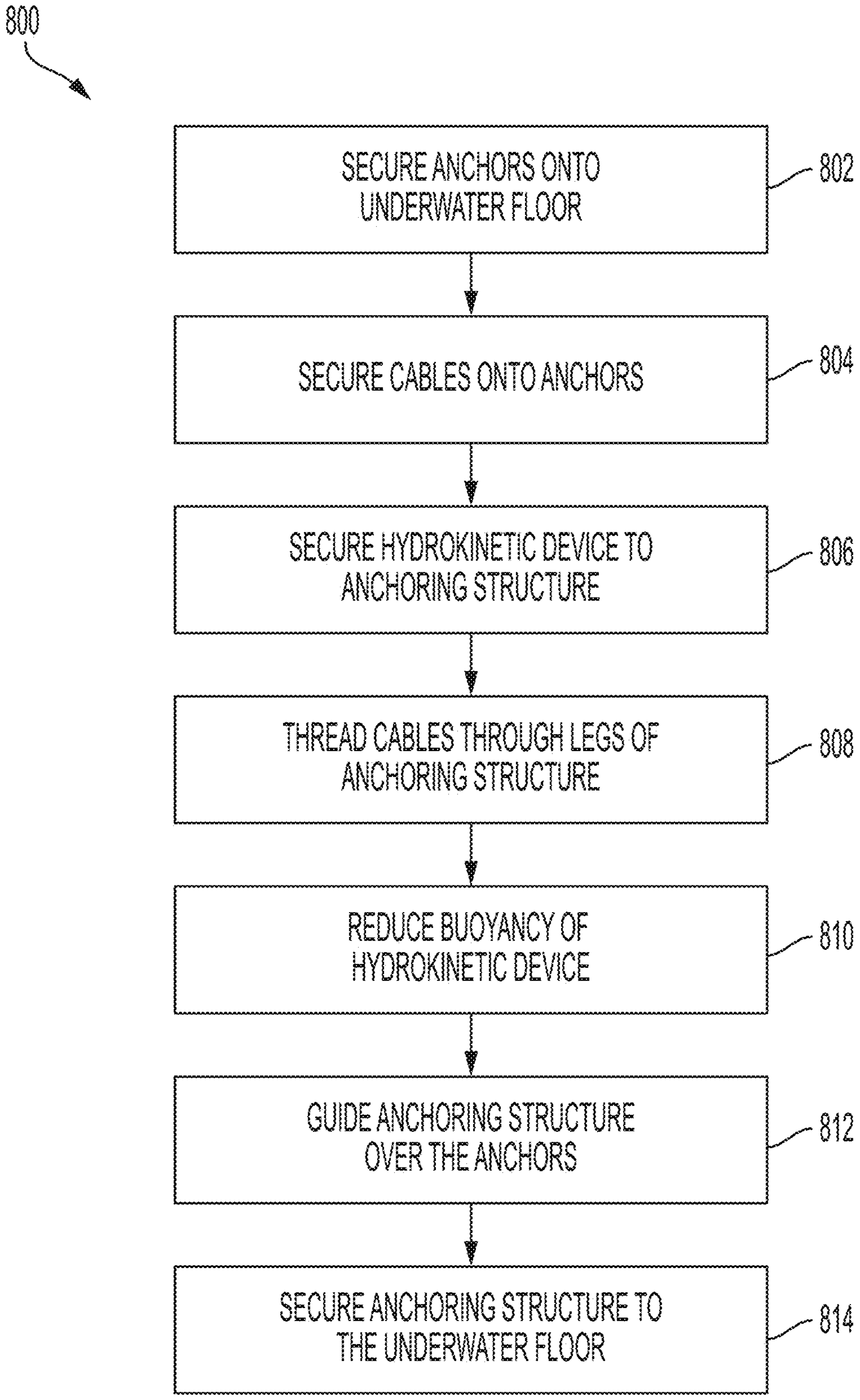
FIG. 8 is a flow diagram for a method of deploying a hydrokinetic system and an anchoring structure beneath the water, according to some embodiments of the present disclosure.

FIG. 8 illustrates a flowchart 800 that describes a method for deploying a hydrokinetic system into a body of water, according to some embodiments. The method involves anchoring the system to the floor of an underwater environment, where both the anchoring structure and the hydrokinetic system are first attached together before lowering the two together through the water. The operations, functions, or actions described in the respective blocks of flowchart 800 may be performed in a differing order than that illustrated, and any two or more blocks may be performed simultaneously in some situations.

At block 802, anchors are secured to the underwater floor, according to some embodiments. Any type of anchors may be used such as T-anchors, screw anchors, plate anchors, or jetted embedment anchors. The anchors may be arranged in a particular pattern to match the positions of legs from an anchoring structure that will be aligned over the anchors.

At block 804, cables are secured onto the anchors, according to some embodiments. Cables may be tied or welded to each anchor before the anchor is driven into the underwater floor. The cables may be long enough to extend from the underwater floor up above the surface of the water so that the other ends of the cables can be used with an anchoring structure, such as anchoring structure 104.

At block 806, a hydrokinetic device is secured to an anchoring structure, according to some embodiments. For example, the hydrokinetic device may include a large duct to allow water to pass through the duct and turn rotors within the duct, such as hydrokinetic device 100. The cylindrical shape of the duct can rest upon a cradle coupled to the anchoring structure, such as anchoring structure 104. According to some embodiments, the hydrokinetic device is secured to the anchoring structure before the two are lowered beneath the water's surface.

At block 808, the cables attached to the anchors are threaded through the legs of the anchoring structure, according to some embodiments. The legs of the anchoring structure include a hollow portion to allow the cable of a given anchor to feed through one of the legs of the anchoring structure. In some examples, the cable feeds through a distal end of a given leg and emerges from the opposite end of the leg.

At block 810, the buoyancy of the hydrokinetic device is reduced, according to some embodiments. The buoyancy can be reduced via the use of one or more ballast tanks on the hydrokinetic device, such as on portions of the duct. Certain ballast tanks can be filled partially or fully with water to change the weight of the hydrokinetic device and affect the speed at which the hydrokinetic device will sink through the water, or can cause the hydrokinetic device to stay at a given position under the water's surface.

At block 812, the anchoring structure (with the hydrokinetic device attached) is guided through the water over the anchors, according to some embodiments. The anchoring structure may be guided via the cables running through one or more of the legs of the anchoring structure. The cables may be pulled taught while the anchoring structure slowly sinks through the water. The anchoring structure's alignment and general position is guided by the cables until each of the legs is brought down over a corresponding anchor on the underwater floor, according to some embodiments.

At block 814, the anchoring structure is secured to the underwater floor, according to some embodiments. According to some embodiments, each leg of the anchoring structure having a respective footpad covers its corresponding anchor on the underwater floor as the anchoring structure is aligned over the various anchors as it is lowered into position. In some embodiments, a series of pulleys and cams disposed within each leg of the anchoring structure are used to pull the cables taut, thus firmly attaching the anchoring structure to the underwater floor.

Figure 9:
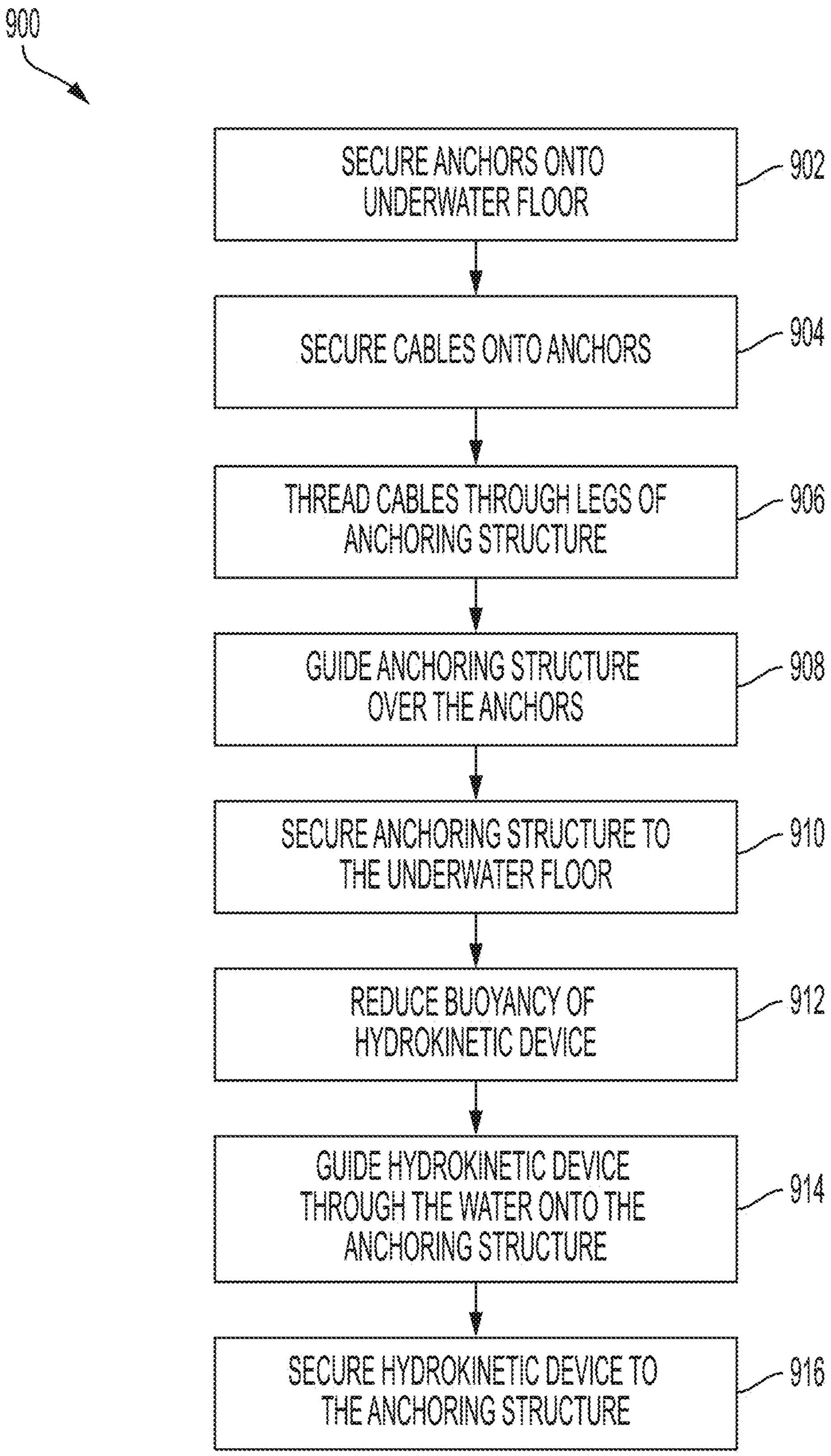
FIG. 9 is a flow diagram for another method of deploying a hydrokinetic system and an anchoring structure beneath the water, according to some embodiments of the present disclosure.

FIG. 9 illustrates a flowchart 900 that describes another method for deploying a hydrokinetic system into a body of water, according to some embodiments. The method involves anchoring the system to the floor of an underwater environment, where the anchoring structure is first attached to the underwater floor, followed by lowering and attaching the hydrokinetic system to the anchoring structure. The operations, functions, or actions described in the respective blocks of flowchart 900 may be performed in a differing order than that illustrated, and any two or more blocks may be performed simultaneously in some situations.

At block 902, anchors are secured to the underwater floor, according to some embodiments. Any type of anchors may be used such as T-anchors, screw anchors, plate anchors, or jetted embedment anchors. The anchors may be arranged in a particular pattern to match the positions of legs from an anchoring structure that will be aligned over the anchors.

At block 904, cables are secured onto the anchors, according to some embodiments. Cables may be tied or welded to each anchor before the anchor is driven into the underwater floor. The cables may be long enough to extend from the underwater floor up above the surface of the water so that the other ends of the cables can be used with an anchoring structure, such as anchoring structure 104.

At block 906, the cables attached to the anchors are threaded through the legs of the anchoring structure, according to some embodiments. The legs of the anchoring structure include a hollow portion to allow the cable of a given anchor to feed through one of the legs of the anchoring structure. In some examples, the cable feeds through a distal end of a given leg and emerges from the opposite end of the leg.

At block 908, the anchoring structure alone is guided through the water over the anchors, according to some embodiments. The anchoring structure may be guided via the cables running through one or more of the legs of the anchoring structure. The cables may be pulled taught while the anchoring structure slowly sinks through the water. The anchoring structure's alignment and general position is guided by the cables until each of the legs is brought down over a corresponding anchor on the underwater floor, according to some embodiments.

At block 910, the anchoring structure is secured to the underwater floor, according to some embodiments. According to some embodiments, each leg of the anchoring structure having a respective footpad covers its corresponding anchor on the underwater floor as the anchoring structure is aligned over the various anchors as it is lowered into position. In some embodiments, a series of pulleys and cams disposed within each leg of the anchoring structure are used to pull the cables taut, thus firmly attaching the anchoring structure to the underwater floor.

At block 912, the buoyancy of a hydrokinetic device is reduced, according to some embodiments. The buoyancy can be reduced via the use of one or more ballast tanks on the hydrokinetic device, such as on portions of the duct. Certain ballast tanks can be filled partially or fully with water to change the weight of the hydrokinetic device and affect the speed at which the hydrokinetic device will sink through the water, or can cause the hydrokinetic device to stay at a given position under the water's surface.

At block 914, the hydrokinetic device is guided through the water onto the anchoring structure at the underwater floor, according to some embodiments. The hydrokinetic device may be manually guided via one or more undersea divers to help position the hydrokinetic device as it slowly sinks through the water. In some embodiments, one or more of the rotors on the hydrokinetic device can be turned to provide some thrust to the overall system and move it through the water. In some embodiments, ballast tanks arranged on different portions of the hydrokinetic device can be filled with air or water to change the center of gravity and buoyancy center of the hydrokinetic device, thus affecting how it moves through the water. Each of these techniques may be used together in any combination to guide the hydrokinetic device through the water and over the anchoring structure.

At block 916, the hydrokinetic device is secured to the anchoring structure, according to some embodiments. For example, the hydrokinetic device may include a large duct to allow water to pass through the duct and turn rotors within the duct, such as hydrokinetic device 100 or hydrokinetic device 800. The cylindrical shape of the duct can rest upon a cradle coupled to the anchoring structure, such as anchoring structure 104. According to some embodiments, the weight of the hydrokinetic device allows it to stay within the cradle of the anchoring structure once it has been aligned and situated on the anchoring structure under the water. According to some other embodiments, one or more mechanical locking mechanisms are used to secure the hydrokinetic device to the anchoring structure.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It can be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A hydrokinetic system, comprising:

a duct;

a first rotor and a second rotor retained in the duct, each of the first and second rotors comprising a plurality of blades and a hub connecting the blades of each rotor to opposite ends of a common shaft;

a first strut coupled to the common shaft and defining a channel for housing a first belt or drive shaft, the first belt or drive shaft in mechanical communication with a first rotor shaft of the first rotor;

a second strut coupled to the common shaft and defining a channel for housing a second belt or drive shaft, the second belt or drive shaft in mechanical communication with a second rotor shaft of the second rotor;

a first generator configured to generate electrical power based on a rotation of the first rotor shaft; and a second generator configured to generate electrical power based on a rotation of the second rotor shaft.

2. The hydrokinetic system of claim 1, wherein the first rotor and the second rotor are configured to rotate in opposite directions.

3. The hydrokinetic system of claim 1, wherein the first rotor and the second rotor each comprises three blades.

4. The hydrokinetic system of claim 1, further comprising a governor coupled to the first or second rotor, the governor being configured to adjust an angle of one or more of the blades of the first or second rotor.

5. The hydrokinetic system of claim 4, wherein the governor is further configured to determine a revolutions-per-minute (RPM) angular speed of the first and/or second rotor and to adjust the angle of one or more of the blades of the first and/or second rotor based on the RPM angular speed of the first and/or second rotor.

6. The hydrokinetic system of claim 1, wherein the first and/or second struts are shaped to increase hydrodynamic flow through the duct.

7. The hydrokinetic system of claim 1, wherein the duct is mechanically secured to a floor within a body of water.

8. The hydrokinetic system of claim 1, wherein the plurality of blades of the first and/or second rotor include a composite material.

9. The hydrokinetic system of claim 1, wherein the duct comprises an annular compartment defined by interior and exterior surfaces of the duct, and the first and second generators are disposed within the annular compartment.

10. The hydrokinetic system of claim 9, wherein the first and second generators are enclosed within first and second pallets that are removable from the duct.

11. The hydrokinetic system of claim 1, further comprising a sealed cavity affixed to an exterior surface of the duct, wherein the first and second generators are disposed within the sealed cavity.

12. The hydrokinetic system of claim 1, further comprising one or more sensors coupled to the duct and configured to monitor flow speed and direction of water through the duct.

13. The hydrokinetic system of claim 1, further comprising one or more sensors configured to monitor an angle of each of the plurality of blades.

14. The hydrokinetic system of claim 1, wherein the hub has a diameter that is less than 10% of a diameter of said corresponding rotor.

15. The hydrokinetic system of claim 1, wherein one or more blades of the first and/or second rotor are configured to be self-feathering in response to a change in a direction of fluid flow across the one or more blades.

16. A hydrokinetic system, comprising:

a duct having a first opening with a first diameter, a second opening opposite from the first opening with the first diameter, and a central passageway connected between the first opening and the second opening and having a second diameter smaller than the first diameter;

a first rotor and a second rotor retained in the central passageway of the duct, each of the first and second rotors comprising a plurality of blades and a hub connecting the blades of each rotor to opposite ends of a common shaft;

a strut coupled to the common shaft and defining a channel for housing a belt or drive shaft, the belt or drive shaft in mechanical communication with a rotor shaft of the first rotor or the second rotor; and a generator configured to generate electrical power based on a rotation of the rotor shaft.

17. The hydrokinetic system of claim 16, further comprising an annular compartment defined by interior and exterior surfaces of the duct, wherein the generator is disposed within the annular compartment.

18. The hydrokinetic system of claim 17, further comprising a differential in mechanical communication with the first and second rotors, the differential constructed and arranged to receive different rotational velocity inputs from the first and second rotors and to drive an output shaft with a single rotational velocity.

19. The hydrokinetic system of claim 18, wherein the generator is coupled to the output shaft and is configured to generate electrical power based on a rotation of the output shaft.

* * * * *